US011256802B1

(12) United States Patent
Forcada et al.

(10) Patent No.: US 11,256,802 B1
(45) Date of Patent: Feb. 22, 2022

(54) APPLICATION BEHAVIORAL FINGERPRINTS

(71) Applicant: CA, Inc., San Jose, CA (US)

(72) Inventors: Joao M. Forcada, Westlake Village, CA (US); Haik A. Mesropian, Glendale, CA (US); Alexander Danileiko, Irvine, CA (US); Christopher J. Peterson, Woodinville, WA (US); Charlotte Chang, Nortridge, CA (US); Huawei Xing, Rolling Hills Estates, CA (US); Artem Egoyan, Burbank, CA (US)

(73) Assignee: CA, INC., New York, NY (US)

( * ) Notice: Subject to any disclaimer, the term of this patent is extended or adjusted under 35 U.S.C. 154(b) by 274 days.

(21) Appl. No.: 16/408,800

(22) Filed: May 10, 2019

(51) Int. Cl.
*G06F 21/56* (2013.01)
*G06F 21/55* (2013.01)

(52) U.S. Cl.
CPC ............ *G06F 21/56* (2013.01); *G06F 21/554* (2013.01); *G06F 2221/034* (2013.01)

(58) Field of Classification Search
None
See application file for complete search history.

(56) References Cited

U.S. PATENT DOCUMENTS

| | | | | |
|---|---|---|---|---|
| 2013/0305359 | A1* | 11/2013 | Gathala | G06F 21/554 726/22 |
| 2015/0007319 | A1* | 1/2015 | Antonov | G06F 21/56 726/23 |
| 2017/0091451 | A1* | 3/2017 | Kovac | H04L 63/145 |
| 2017/0329968 | A1* | 11/2017 | Wachdorf | G06F 21/566 |
| 2020/0153863 | A1* | 5/2020 | Wiener | H04W 4/60 |

OTHER PUBLICATIONS

McAfee, Internet Security Suite User Guide, Jan. 2006, McAfee, 145 Pages Total (Year: 2006).*

\* cited by examiner

*Primary Examiner* — Christopher C Harris
(74) *Attorney, Agent, or Firm* — Adsero IP

(57) ABSTRACT

Methods, systems, and devices for protecting against abnormal computer behavior are described. The method may include monitoring a computer process related to an application running on a computing device of one or more computing devices, analyzing a database including a set of digital fingerprints, where a digital fingerprint of the set of digital fingerprints relates to the application, the digital fingerprint including an indication of a set of computer processes related to the application that are classified as normal computer processes for the application, determining that the computer process related to the application is an abnormal computer process based on analyzing, and performing a security action on the computing device to protect the computing device against the abnormal computer process based on the determining.

18 Claims, 10 Drawing Sheets

APPLICATION BEHAVIORAL FINGERPRINTS

BACKGROUND

The use of computer systems and computer-related technologies continues to increase at a rapid pace. The expansive use of computer systems has influenced the advances made to computer-related technologies. Computer systems have increasingly become an integral part of the business world and the activities of individual consumers. Computer systems may be used to carry out several business, industry, and academic endeavors.

The widespread use of computers and mobile devices has caused an increased presence in malicious behavior including data theft, embedding malware and viruses, and the like. Malware may include software (e.g., processes, executable files, data objects, etc.) that is intended to damage or disable computer systems. Security methods for malware detection may be beneficial in preventing malware from damaging these systems or devices.

SUMMARY

The described techniques relate to improved methods, systems, computing devices, and apparatuses that support application behavioral fingerprints to protect data and the devices against malicious programs such as ransomware, viruses, a worms, Trojans, rootkits, grayware, spyware, keyloggers, among others. For example, a computing device may build, aggregate, enforce, or any combination thereof, application behavioral fingerprints (e.g., a set of sequences of bits). The computing device may build a partial fingerprint based on a computer behavior (e.g., a process, feature, action, etc.) of an application or process. The computing device may generate a digital fingerprint for the application according to one or more partial fingerprints. In some examples, the computing device or a network device may aggregate one or more fingerprints associated with an application into a broader digital fingerprint (e.g., a digital fingerprint including computer behaviors that are considered normal). In some examples, the computing device or another computing device may compare a monitored computer behavior to the broader fingerprint and determine whether the computer behavior is a normal or an abnormal computer behavior. For example, the computing device may determine that the computer behavior is an abnormal computer behavior and may perform a security action to protect the computing device from the abnormal computer behavior, the application, or both. Benefits of the present disclosure may include robust, efficient, and automatic threat detection, by enabling the generation, access, and use of application behavioral fingerprints.

A method of protecting against abnormal computer behavior is described. The method may be performed by one or more computing devices including at least one processor. The method may include monitoring a computer process related to an application running on a computing device of the one or more computing devices, analyzing a database including a set of digital fingerprints, where a digital fingerprint of the set of digital fingerprints relates to the application, the digital fingerprint including an indication of a set of computer processes related to the application that are classified as normal computer processes for the application, determining that the computer process related to the application is an abnormal computer process based on the analyzing (e.g., analyzing the digital fingerprint of the application), and performing a security action on the computing device to protect the computing device against the abnormal computer process based on the determining.

An apparatus for protecting against abnormal computer behavior of one or more computing devices is described. The apparatus may include a processor, memory in electronic communication with the processor, and instructions stored in the memory. The instructions may be executable by the processor to cause the apparatus to monitor a computer process related to an application running on a computing device of the one or more computing devices, analyze a database including a set of digital fingerprints, where a digital fingerprint of the set of digital fingerprints relates to the application, the digital fingerprint including an indication of a set of computer processes related to the application that are classified as normal computer processes for the application, determine that the computer process related to the application is an abnormal computer process based on the digital fingerprint of the application, and perform a security action on the computing device to protect the computing device against the abnormal computer process based on the determining.

Another apparatus for protecting against abnormal computer behavior is described. The apparatus may include means for monitoring a computer process related to an application running on a computing device of one or more computing devices, analyzing a database including a set of digital fingerprints, where a digital fingerprint of the set of digital fingerprints relates to the application, the digital fingerprint including an indication of a set of computer processes related to the application that are classified as normal computer processes for the application, determining that the computer process related to the application is an abnormal computer process based on the digital fingerprint of the application, and performing a security action on the computing device to protect the computing device against the abnormal computer process based on the determining.

A non-transitory computer-readable medium storing code for protecting one or more computing devices against abnormal computer behavior is described. The code may include instructions executable by a processor to monitor a computer process related to an application running on a computing device of the one or more computing devices, analyze a database including a set of digital fingerprints, where a digital fingerprint of the set of digital fingerprints relates to the application, the digital fingerprint including an indication of a set of computer processes related to the application that are classified as normal computer processes for the application, determine that the computer process related to the application is an abnormal computer process based on the digital fingerprint of the application, and perform a security action on the computing device to protect the computing device against the abnormal computer process based on the determining.

In some examples of the method, apparatuses, and non-transitory computer-readable medium described herein, the indication includes a bit sequence, one or more bits of the bit sequence corresponding to a computer process of the set of computer processes. In some examples of the method, apparatuses, and non-transitory computer-readable medium described herein, the bit sequence includes a partial digital fingerprint related to the application.

In some examples of the method, apparatuses, and non-transitory computer-readable medium described herein, the digital fingerprint includes an additional indication of a set of additional computer processes associated with the set of computer processes, and the set of additional computer processes classify as additional normal computer processes associated with the set of computer processes.

Some examples of the method, apparatuses, and non-transitory computer-readable medium described herein may further include operations, features, means, or instructions for automatically generating the database including the set of digital fingerprints.

In some examples of the method, apparatuses, and non-transitory computer-readable medium described herein, automatically generating the database including the set of digital fingerprints may include operations, features, means, or instructions for monitoring a set of computer process behaviors associated with the set of computer processes, generating a bit sequence corresponding to the set of computer processes based on the set of computer process behaviors, one or more bits of the bit sequence corresponding to a computer process of the set of computer processes, and receiving, from one or more additional computing devices of the one or more computing devices, one or more additional bit sequences corresponding to the set of computer processes based on an additional set of computer process behaviors.

In some examples of the method, apparatuses, and non-transitory computer-readable medium described herein, receiving, from one or more additional computing devices of the one or more computing devices, one or more additional bit sequences corresponding to the set of computer processes may include operations, features, means, or instructions for monitoring, by the one or more additional computing devices of the one or more computing devices, the additional set of computer process behaviors associated with the set of computer processes, and generating, by the one or more additional computing devices of the one or more computing devices, the one or more additional bit sequences corresponding to the set of computer processes based on the additional set of computer process behaviors.

In some examples of the method, apparatuses, and non-transitory computer-readable medium described herein, the one or more additional bit sequences generated by the one or more additional computing devices of the one or more computing devices includes one or more additional partial digital fingerprints related to the application.

Some examples of the method, apparatuses, and non-transitory computer-readable medium described herein may further include operations, features, means, or instructions for performing an analysis on the bit sequence corresponding to the set of computer process behaviors generated by the computing device and the one or more additional bit sequences corresponding to the set of computer process behaviors generated by the one or more additional computing devices of the one or more computing devices, where the analysis includes determining that the set of computer processes classify as the normal computer processes for the application based on a correlation between the bit sequence corresponding to the set of computer process behaviors generated by the computing device and the one or more additional bit sequences corresponding to the set of computer process behaviors generated by the one or more additional computing devices of the one or more computing devices, and generating the digital fingerprint related to the application based on the correlation.

In some examples of the method, apparatuses, and non-transitory computer-readable medium described herein, generating the digital fingerprint related to the application further may include operations, features, means, or instructions for aggregating matching computer process behaviors associated with the set of computer processes based on the correlation, and discarding nonmatching computer process behaviors associated with the set of computer processes based on the correlation.

In some examples of the method, apparatuses, and non-transitory computer-readable medium described herein, performing the security action may include operations, features, means, or instructions for transmitting, to the computing device, a report including information of the abnormal computer process related to the application running on the computing device.

Some examples of the method, apparatuses, and non-transitory computer-readable medium described herein may further include operations, features, means, or instructions for including, in the report, a selectable option to perform a supplementary security action including at least one of preventing access to a network enterprise for the computing device, preventing access to one or more features of the computing device, or performing a malware scan on the computing device, or any combination thereof.

Some examples of the method, apparatuses, and non-transitory computer-readable medium described herein may further include operations, features, means, or instructions for performing the security action includes at least one of quarantining the application on the computing device, preventing access to a network enterprise for the computing device, preventing access to one or more features of the computing device, performing a malware scan on the computing device, or any combination thereof.

In some examples of the method, apparatuses, and non-transitory computer-readable medium described herein, performing the security action may include operations, features, means, or instructions for transmitting, to a computing device that may be associated with an information security user, a report including information of the abnormal computer process related to the application and a selectable option to perform a supplementary security action including at least one of preventing access to a network enterprise for the computing device, preventing access to one or more features of the computing device, or performing a malware scan on the computing device, or any combination thereof.

Figure 1:
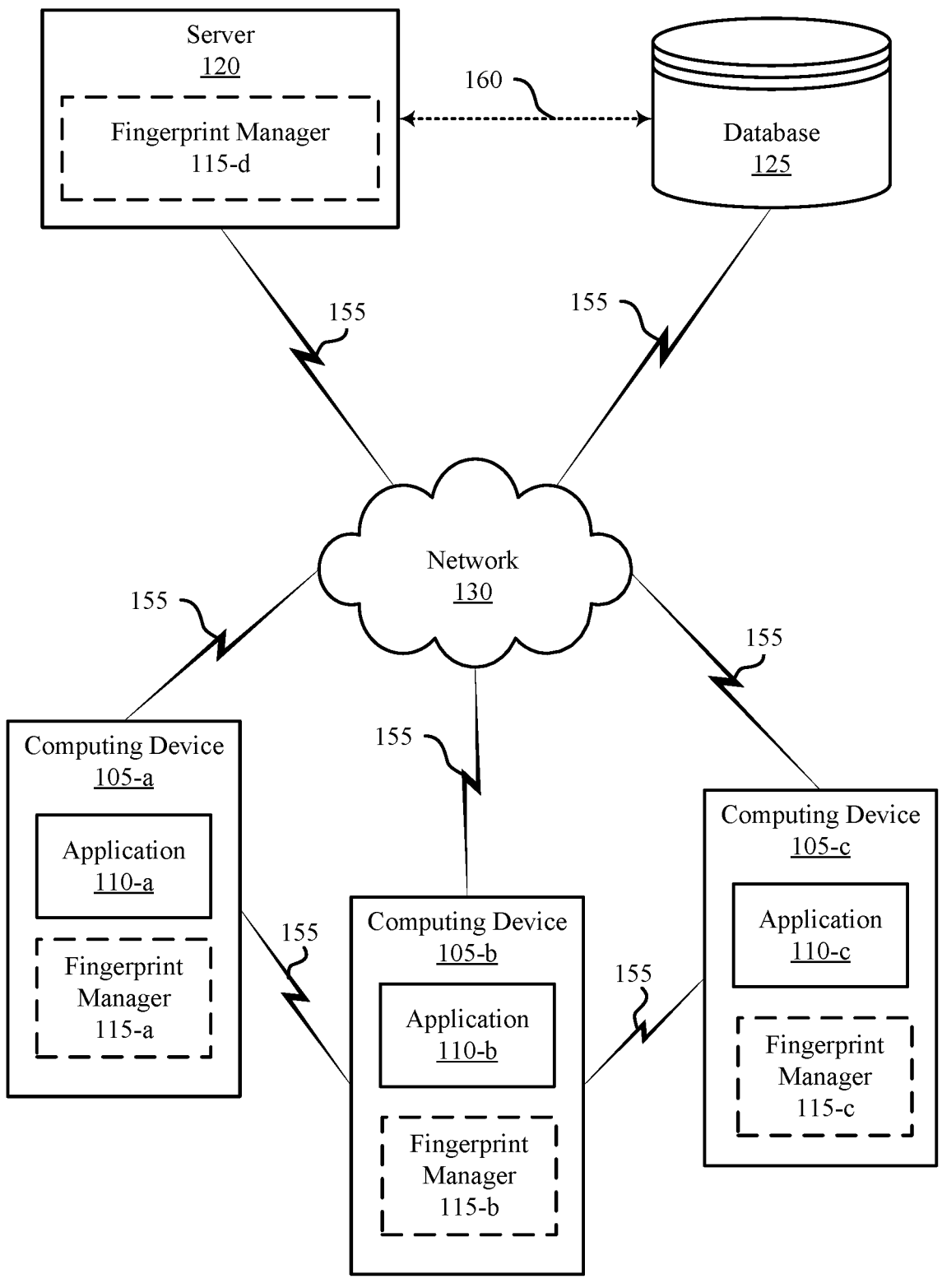
FIG. 1 illustrates an example of an environment that supports application behavioral fingerprints in accordance with aspects of the present disclosure.

While the cases described herein are susceptible to various modifications and alternative forms, specific cases have been shown by way of example in the drawings and will be described in detail herein. However, the exemplary cases described herein are not intended to be limited to the particular forms disclosed. Rather, the instant disclosure covers all modifications, equivalents, and alternatives falling within the scope of the appended claims.

DETAILED DESCRIPTION

The described techniques relate to improved methods, systems, or devices that support security threat detection. Some present techniques may be effective in preventing security threats including data theft, embedding malware and viruses, and the like on various user devices. For example, the methods, systems, or devices described herein may support the building, aggregation, or enforcement of application behavioral fingerprints. These fingerprints may enable the detection of abnormal computer behaviors (e.g., of an application executing on a computing device). This detection may enable detection and prevention of the abnormal computer behaviors, for example, performance of an action to protect a system or device from the abnormal computer behavior.

A computing device may run an application, for example, such as, a software program, an application program, or another computing process. The computing device and/or a remote computing device may monitor (e.g., monitor in real time) the application for computer behaviors. In some examples, computer behaviors may be computer processes, computer operations, computer actions, computer data, or computer features associated with an application. For example, a computing device may run an application and may monitor the application for computer processes such as loading, saving, or accessing files (e.g., accessing one or more dynamic link library (.dll) files), a user-interface (UI) associated with the application, actions such as loading or saving data to a clipboard, accessing a network, or any other application computer processes.

In some examples, the present techniques may include building one or more application behavioral fingerprints based on the monitoring. For example, the present techniques may include tracking computer behaviors of an application and creating a fingerprint (also referred to as a digital fingerprint) associated with the tracked computer behaviors. In some examples, the digital fingerprint may be data associated with the tracked computer behaviors of an application. For example, the digital fingerprint may include a sequence of bits describing the computer behaviors (e.g., computer processes, computer actions, and the like) that the application or computer process performs or is expected to perform. In some examples, the computing device may generate a partial digital fingerprint indicating a computer behavior or computer process of the application. For example, the partial digital fingerprint may be at least one bit indicating or associated with a computer behavior, and the computing device may include the at least one bit in the sequence of bits (e.g., the digital fingerprint associated with the computer behaviors of the application). The present techniques may include may combining multiple partial digital fingerprints to generate a digital fingerprint (e.g., the sequence of bits) of the application.

In some examples, the present techniques may include aggregating one or more application behavioral fingerprints. For example, a computing device (e.g., local computing device, remote computing device, backend server) may receive one or more application behavioral digital fingerprints from one or more other computing devices. The present techniques may include aggregating the received digital fingerprints and may generate an aggregate digital fingerprint of an expected computer behavior based on the aggregate digital fingerprints. For example, the aggregate digital fingerprint may include a sequence of bits associated with normal or expected computer behaviors of the application. The present techniques may include determining whether a computer behavior is normal or expected based on the aggregate digital fingerprints.

In some examples, the present techniques may include performing an algorithm to extract the most common computer behaviors (e.g., bits associated with the computer behavior) from the aggregate digital fingerprints. The present techniques may include generating the aggregate digital fingerprint (e.g., a sequence of bits associated with the most common computer behaviors) based on the algorithm. In some cases, a digital fingerprint may describe one or more known or expected computer behaviors of an application (e.g., normal computer behaviors, abnormal computer behaviors, malware-indicating computer behaviors). In some cases, a first digital fingerprint may describe one or more computer behaviors of an application and a second digital fingerprint may describe one or more other computer behaviors of the application. In some cases, a computer behavior may be defined as a digital fingerprint (e.g., included a database of digital fingerprints) when the computer behavior satisfies a threshold (e.g., most common computer behaviors). In one example, a computer behavior may be defined as a digital fingerprint once the computer behavior is observed occurring on a certain number of computing devices or occurring with a certain frequency on the certain number of computing devices. Additionally or alternatively, a computer behavior may be defined as a digital fingerprint once the computer behavior is observed occurring a certain number of times or occurring with a certain frequency on a particular computing device.

In other examples, the present techniques may include generating the aggregate digital fingerprint by other means, for example, such as selecting normal/expected computer behaviors manually, using statistical analysis to remove outlier computer behaviors from the aggregate digital fingerprints, or other methods. In some examples, the present techniques may include creating a database of the digital fingerprints. For example, the present techniques may include generating a database including one or more applications and each application's one or more associated aggregate digital fingerprints. The present techniques may include making the database available for use (e.g., queries) by other computing devices and may transmit data in the database to other computing devices (e.g., based on a request, from another computing device, for data indicating an application and an associated aggregate digital fingerprint).

In some examples, the present techniques may include comparing a computer behavior of an application or computer process to an associated application behavioral digital fingerprint (e.g., aggregate digital fingerprint). For example, a computing device may monitor a computer behavior (e.g., a computer action, a computer process, computer data, etc.) of an application executing on the computing device or on a remote computing device and determine whether the computer behavior is included in or matches a computer behavior of an aggregate digital fingerprint associated with the application. In some examples, the computing device may search the aggregate digital fingerprint (e.g., the sequence of bits associated with one or more normal/expected computer behaviors of the application) for a matching computer behavior to the monitored computer behavior (e.g., at least one bit associated with the computer behavior). The computing device may determine that the monitored computer behavior is a normal computer behavior based on the analysis. In some other examples, the computing device may determine that the monitored computer behavior is an abnormal computer behavior based on the analysis. In some cases, the computing device may determine the monitored computer behavior is unknown (e.g., the monitored computer behavior is not found in the aggregate digital fingerprint).

In some examples, the computing device may perform a security action. In one example, the computing device may detect that a monitored computer behavior is an abnormal computer behavior. The computing device may determine to prevent or block the abnormal computer behavior. In one example, the computing device may detect that a monitored computer behavior is an unknown computer behavior. In some cases, the computing device may generate a notification or a warning based on the detection of the unknown computer behavior. For example, the computing device may display a warning on a screen associated with the computing device that generates the unknown computer behavior. In some cases, the computing device may send a notification to a computing device of an information security user. In some cases, the notification may include information regarding the application and unknown computer behavior. The information included in the notification may include at least one of a name of the application, a name of the affected computing device running the application, user account information, computer code of application or process of the application associated with the unknown computer behavior, screenshot of unknown computer behavior, screen recording capturing video of the unknown computer behavior, keyboard input information associated with the unknown computer behavior, or mouse input information associated with the unknown computer behavior, or any combination thereof.

In one example, the computing device may perform a security action in response to detecting the abnormal computer behavior. In some examples, a security action may include generating, transmitting, or displaying a report indicating information related to the abnormal computer behavior, quarantining the application or the abnormal computer behavior (e.g., ending one or more computer processes of the application), preventing access of the application to a network enterprise for the computing device, preventing access of the application, preventing one or more features of the affected computing device or an operating system of the affected computing device (e.g., programs, files, memory, etc.), performing a malware scan on the application or affected computing device, or any combination thereof. For example, the present techniques may include transmitting a report including a selectable option to perform one or more additional security actions. Additionally or alternatively, the present techniques may include determining to perform a security action before transmitting a report, or may perform a security action without transmitting a report.

Particular aspects of the subject matter described in this disclosure may be implemented to realize one or more of the following potential advantages. The described schemes for application behavioral fingerprints may support improvements in security threat detection, among other advantages. Supported schemes may include features for efficient building, aggregation, or enforcement of application behavioral fingerprints. The described techniques may also support increased detection of abnormal behaviors and, in some examples, may promote enforcement of the abnormal behaviors, for example, performance of a security action to protect a system or device from the abnormal behavior, among other benefits.

Aspects of the disclosure are initially described in the context of an environment (e.g., a network architecture) that supports application behavioral fingerprints. Aspects of the disclosure are further illustrated in context of a process flow that relates to aspects for application behavioral fingerprints. Aspects of the disclosure are further illustrated by and described with reference to computing device diagrams, system diagrams, and flowcharts that relate to application behavioral fingerprints.

FIG. 1 illustrates an example of an environment 100 that supports application behavioral fingerprints in accordance with aspects of the present disclosure. As depicted, the environment 100 may include a computing device 105-*a*, a computing device 105-*b*, a computing device 105-*c*, a server 120, and a database 125. The techniques described herein may be performed on a device (e.g., a computing device 105 or the server 120, or both). In the illustrated embodiment, the computing devices 105, the server 120, and the database 125, may be communicatively coupled via a network 130 (e.g., via communication links 155).

The computing devices 105 in the environment 100 may be used by way of example. While the environment 100 illustrates three computing devices 105, the present disclosure applies to any system architecture having one or more computing devices 105. Furthermore, while a single network is coupled to the computing devices 105, the server 120, and the database 125, the present disclosure applies to any system architecture having any number of networks that may be communicatively coupled to the computing devices 105, the server 120, and the database 125. Similarly, while the environment 100 illustrates a single server, the present disclosure applies to any system architecture having one or more servers.

In some examples, the computing devices 105, the server 120, and the database 125 may include a personal electronic device such as a cellular phone, a personal digital assistant (PDA), a tablet computer, a laptop computer, or a personal computer. In some examples, the computing devices 105 may have one or more applications installed. For example, the computing device 105-*a* may include an application 110-*a*, the computing device 105-*b* may include an application 110-*b*, and the computing device 105-*c* may include an application 110-*c*. The applications 110 may be a same or a different application downloaded, installed, and running on the computing devices 105. In some other examples, the computing devices 105 may have one or more additional applications installed. In some examples, the computing device 105-*a* may include a fingerprint manager 115-*a*, the computing device 105-*b* may also include a fingerprint manager 115-*b*, and the computing device 105-*c* may also include a fingerprint manager 115-*c*. While the environment 100 illustrates the computing devices 105 each including a fingerprint manager 115, the present disclosure applies to any of the computing devices 105 (e.g., at least one) optionally having a fingerprint manager.

In some examples, the computing devices 105, the server 120, or both may include a fingerprint manager 115 where at least a portion of the functions of the fingerprint manager 115 are performed separately or concurrently on the computing devices 105 or the server 120, or both. Similarly, in some cases, a person may access the functions of the computing devices 105 (directly or through the computing device 105 via fingerprint manager 115). For example, the computing devices 105 may include a mobile-based application that interfaces with one or more functions of the fingerprint managers 115 or the server 120.

It is noted that in some cases, the computing devices 105, the server 120, or both may not include a fingerprint manager 115. For example, the computing devices 105 may include the applications 110 that allows the computing devices 105 to interface with a fingerprint manager 115 that may be located on another computing device or the server 120. Although the components of the computing devices 105 are depicted as being internal to the computing device 105, it is understood that one or more of the components may be external to the computing devices 105 and connect to the computing devices 105 through wired or wireless connections, or both (e.g., via the communication links 155).

The server 120 may be a computing system or an application that may be an intermediary node in the environment 100 between the computing devices 105, or the database 125. The server 120 may include any combination of a social network server, data server, a cloud server, a server associated with an automation service provider, proxy server, mail server, web server, application server, database server, communications server, file server, home server, mobile server, name server, or any combination thereof. In some cases, the server 120 may include an application distribution platform. In some examples, the server 120 may include a fingerprint manager 115-d.

The server 120 may receive a request from one or more of the computing devices 105 seeking resources from the server 120 and/or the database 125. In some cases, the computing devices 105 may communicate with the server 120 via the network 130. Examples of the network 130 may include any combination of cloud networks, local area networks (LAN), wide area networks (WAN), virtual private networks (VPN), wireless networks (using 802.11, for example), cellular networks (using third generation (3G), fourth generation (4G) (e.g., Long-Term Evolution (LTE)), or fifth generation (5G) new radio (NR) systems, for example), etc. In some examples, network 130 may include the Internet. In some examples, the server 120 may be coupled to the database 125, via a communication link 160. The communication link 160 may be a wired connection or a wireless connection.

The database 125 may store fingerprints corresponding to applications 110. For example, the database 125 may be a relational database and may include a table that may have a set of data elements (e.g., fingerprint information). For example, the table may include a number of columns, and a number of rows. Each row may be associated with an application, and each column may include fingerprint information (e.g., a bit or a sequence of bits corresponding to a process, action, etc. of an application 110). In some examples, the database 125 may correlate fingerprints corresponding to applications 110 with a temporal identifier (e.g., timestamp).

In some examples, the computing device 105-a may run the application 110-a. The computing device 105-a may also implement one or more functions of the fingerprint manager 115-a. For example, the computing device 105-a may utilize the fingerprint manager 115-a to monitor the application 110-a for computer behaviors. In some examples, computer behaviors may be processes, operations, actions, data, or features associated with the application 110-a. For example, the computing device 105-a may monitor the application 110-a for computer processes such as loading, saving, or accessing files (e.g., accessing one or more .dll files), a UI associated with the application, actions such as loading or saving data to a clipboard, accessing a network, or any other application processes. In some examples, the computing device 105-a may monitor for individual computer behaviors or may monitor for groups of computer behaviors. For example, a group of computer behaviors may include one or more computer processes, operations, actions, data, or features of an application 110 (e.g., computer processes of an application 110-a) or multiple applications 110 (e.g., monitoring for behaviors such as accessing a network for multiple applications 110). As an example, the application 110-a may be a calculator application (e.g., calc.exe). The computing device 105-a may monitor a computer behavior or a group of computer behaviors of the calculator application, such as determining that the calculator application includes a UI, is accessing one or more .dll files, loading data to or from a clipboard, and the like.

In some examples, a computing device 105, the server 120, or both may build one or more application behavioral fingerprints. For example, the computing device 105-a (e.g., using the fingerprint manager 115-a) may monitor the computer behaviors of the application 110-a and create a fingerprint associated with the computer behaviors. In some examples, the fingerprint may be data associated with the tracked computer behaviors of the application 110-a. For example, the fingerprint may include a sequence of bits describing the computer behaviors (e.g., computer processes, actions, and the like) that an application or process (e.g., application 110-a) performs or is expected to perform. In some examples, the computing device 105-a may generate a partial fingerprint indicating a computer behavior or computer process of the application 110-a. For example, the partial fingerprint may be at least one bit indicating or associated with a computer behavior, and the computing device 105-a may include the at least one bit in the sequence of bits (i.e., the fingerprint associated with the computer behaviors of the application 110-a).

The computing device 105-a may combine multiple partial fingerprints to generate a fingerprint (e.g., the sequence of bits) of the application 110-a. As an example, the computing device 105-a may monitor the computer behaviors of a calculator application as discussed herein. For instance, the computing device 105-a may determine that the calculator application is loading a specific file (e.g., a .dll file). The computing device 105-a may track the loading and generate a partial fingerprint for the computer behavior (e.g., at least one bit indicating the loading, the file being loaded, and other data associated with the computer behavior). The computing device 105-a may generate a partial fingerprint for multiple computer behaviors of the calculator application and may combine the partial fingerprints into a fingerprint of the calculator application (e.g., a sequence of bits describing the computer behaviors of the calculator application).

In some examples, a computing device 105, a network device (e.g., the server 120), or both, may aggregate one or more application behavioral fingerprints. For example, the computing device 105-b may receive one or more application behavioral fingerprints from other computing devices 105. In some examples, the computing device 105-b may receive a fingerprint associated with the application 110-a from the computing device 105-a. The computing device 105-b may also receive a fingerprint from computing device 105-c (e.g., a fingerprint of the application 110-c being run/monitored on computing device 105-c). The computing device 105-*b* may aggregate the received fingerprints and may generate an aggregate fingerprint. The aggregate fingerprint may include a sequence of bits associated with normal computer behaviors of an application 110 (e.g., the application 110-*a*). In some examples, the computing device 105-*b* may perform an algorithm to extract at least the most common computer behaviors (i.e., bits indicating a computer behavior) and generate aggregate fingerprints for at least the most common computer behaviors. The computing device 105-*b* may generate the aggregate fingerprint (e.g., a sequence of bits associated with the most common computer behaviors) based on the algorithm. In some examples, the computing device 105-*b* may generate the aggregate fingerprint by other means (e.g., selecting normal computer behaviors manually, using statistical analysis to remove outlier computer behaviors from the aggregate fingerprints, or other methods). For instance, the computing device 105-*b* may classify a set of computer behaviors or computer processes as normal computer behaviors or computer processes based on a correlation between the aggregate fingerprints.

As an example, the computing device 105-*b* may receive a fingerprint associated with a calculator application from each of computing devices 105-*a*, 105-*c*. The computing device 105-*b* may aggregate the fingerprints and generate an aggregate fingerprint for the calculator application. The aggregate fingerprint may include a set of computer behaviors (e.g., a sequence of bits) of the calculator application determined to be normal (e.g., by using an algorithm to determine the most common computer behaviors).

In some examples, the computing device 105-*b* may create or update the database 125. For example, the database 125 may be updated to include a data entry of the aggregate fingerprint and an indication of the application 110-*a*. The database 125 may include indications of other applications 110 (e.g., applications 110-*b*, 110-*c*) and each application 110's associated aggregate fingerprint. The database 125 may be uploaded or maintained by a device (e.g., a computing device 105, the server 120, or both) for use by the computing devices 105. Additionally or alternatively, a device may transmit data in the database 125 (e.g., the data entry of an application 110 and an associated aggregate fingerprint) to other computing devices 105 (e.g., based on a request from a computing device 105 for data indicating an application 110 and an associated aggregate fingerprint).

In some examples, a computing device 105, a network device (e.g., the server 120), or both may compare a computer behavior of an application or process (e.g., an application 110) to an associated application behavioral fingerprint. For example, the computing device 105-*c* may compare a computer behavior of an application 110-*c* to an associated application behavioral fingerprint. The computing device 105-*c* may monitor a computer behavior (e.g., an action, process, data, etc.) of the application 110-*c*. The computing device 105-*c* may determine an aggregate fingerprint associated with application 110-*c* (e.g., by requesting data from the database 125). The computing device 105-*c* may determine whether the monitored computer behavior (e.g., at least one bit indicating the monitored computer behavior) is included in an aggregate fingerprint (e.g., a sequence of bits indicating normal behaviors) of the application 110-*c*. In some examples, the computing device 105-*c* may search the aggregate fingerprint for a matching computer behavior or an indication of a matching computer behavior to the monitored computer behavior. In some other examples, the computing device 105-*c* may transmit a fingerprint to an enforcement agent (e.g., fingerprint manager 115-*c*, fingerprint manager 115-*d*, etc.).

In some cases, the enforcement agent may monitor the process or application 110-*c* for deviations from the fingerprint (e.g., a change in computer processes or computer behaviors of the set of computer behaviors included in the aggregate fingerprint). In some examples, the computing device 105-*c* may determine that the monitored computer behavior is a normal computer behavior. In other examples, the computing device 105-*c* may determine that the monitored computer behavior is an abnormal computer behavior. For example, the computing device 105-*c* may be unable to find the computer behavior (e.g., an indication of the computer behavior including at least one bit) in the aggregate fingerprint, or may determine that a deviation of computer behaviors (e.g., from an aggregate fingerprint of the application 110-*c*) has occurred. As an example, the computing device 105-*c* may compare a computer behavior of a calculator application (e.g., accessing a network) to a fingerprint (e.g., an aggregate fingerprint) of the calculator application. The computing device 105-*c* may determine that the computer behavior is not included in the fingerprint. For instance, the computing device 105-*c* may determine that the calculator application accessing a network is an abnormal computer behavior based on a network accessing computer behavior not being indicated or found in the aggregate fingerprint of the calculator application. In some cases, a fingerprint may include one or more predetermined abnormal computer behaviors. In some cases, an abnormal computer behavior may be detected when analysis of a monitored computer behavior indicates the monitored computer behavior matches the abnormal computer behavior included in a fingerprint.

In some examples, a computing device 105, a network device (e.g., the server 120), or both may perform a security action. For example, the computing device 105-*c* may detect that a monitored computer behavior is an abnormal computer behavior as described herein. The computing device 105-*c* may determine to enforce the abnormal computer behavior. For example, the computing device 105-*c* may perform a security action in response to detecting the abnormal computer behavior of application 110-*c*. In some examples, a security action may include generating, transmitting, or displaying a report indicating information related to the abnormal computer behavior, quarantining the application 110-*c* or the abnormal computer behavior (e.g., ending one or more computer processes of the application 110-*c*), preventing access of the application 110-*c* to a network enterprise for the computing device 105-*c*, preventing access of the application 110-*c* to one or more features (e.g., programs, files, memory, etc.) of the computing device 105-*c*, performing a malware scan on the application 110-*c* or computing device 105-*c*, or any combination thereof. For example, the computing device 105-*c* may transmit a report including a selectable option to perform one or more additional security actions. In some examples, a security agent or administrator may receive the report and may select a security action from a list of security actions to perform on the computing device 105-*c*. Additionally or alternatively, the computing device 105-*c* may determine to perform a security action before transmitting a report, or may perform a security action without transmitting a report. As an example, the computing device 105-*c* may detect an abnormal computer behavior (e.g., accessing a network) of a calculator application. The computing device 105-*c* may perform a security action based on the detection. For instance, the computing device 105-c may determine to prevent access of the calculator application to the network 130.

In some examples, the computing device 105-c may run an application 110-c such as a security application, an enforcement application (e.g., including an enforcement agent), a data loss application (e.g., an application to recover lost data such as from a malicious attack), etc. For example, the computing device 105-c may run an enforcement application to perform some of the aspects of this disclosure, such as performing a security action. In some examples, the enforcement application may include policy definitions.

In some examples, the policy definitions may be a set of policies regarding the enforcement of one or more applications 110 of the computing device 105-c. For example, the policy definitions may include rules for monitoring an application 110 (e.g., how often to monitor the computer behaviors of the application 110, which applications 110 to monitor, and the like), rules for enforcing an application 110 (e.g., which security actions to perform to an application 110), and the like. In some examples, the computing device 105-c may detect an abnormal computer behavior and update the policy definitions. For example, the computing device 105-c may determine to update the policy definitions associated with application 110-c to stricter policy definitions based on detecting an abnormal computer behavior of application 110-c. For instance, the computing device 105-c (e.g., the enforcement application) may update the policy definitions to monitor the application 110-c more often, to immediately quarantine the application 110-c if an abnormal computer behavior occurs or persists, etc.

Such policy updates may provide for dynamic security enhancement based on the application behavioral fingerprints. For example, the computing device 105-c may determine that there are no abnormal computer behaviors for application 110-c and may monitor the application 110-c less often to reduce power consumption or memory utilization. Additionally or alternatively, the computing device 105-c may identify an abnormal computer behavior of the application 110-c and perform more rigorous security enforcement and/or increased monitoring (e.g., increased monitoring frequency) to enable more robust detection and security enhancement.

As described herein, computing devices 105 and server 120 may realize one or more of the following potential advantages. The computing devices 105 and server 120 may support improvements in security threat detection, among other advantages. For example, computing devices 105 and server 120 may promote efficient creation, aggregation, and enforcement of application behavioral fingerprints. Therefore, computing devices 105 and server 120 may also support increased detection of abnormal computer behaviors and, in some examples, may promote enforcement of the abnormal computer behaviors, for example, performance of a security action to protect computing devices 105 and server 120 from the abnormal computer behavior, among other benefits. Thereby, the techniques described herein may provide improvements to the operation of computing devices 105 and server 120, for example, such as improved processor operation, reduced power consumption, improved memory utilization, among other benefits by enabling application behavioral fingerprints.

Figure 2:
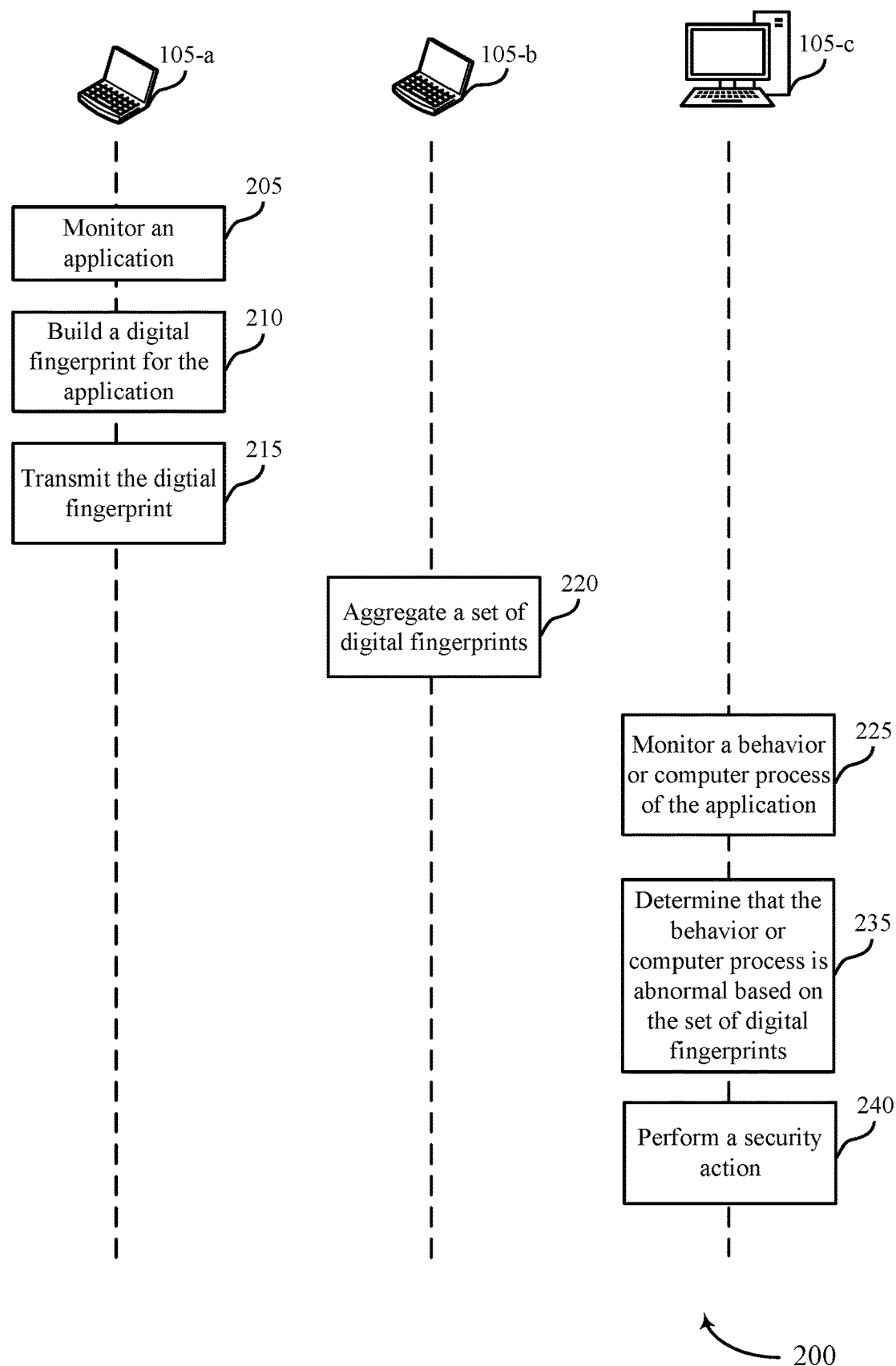
FIG. 2 illustrates an example of a process flow that supports application behavioral fingerprints in accordance with aspects of the present disclosure.

FIG. 2 illustrates an example of a process flow 200 that supports application behavioral fingerprints in accordance with aspects of the present disclosure. In some examples, process flow 200 may implement aspects of environment 100. The computing device 105-a, the computing device 105-b, and the computing device 105-c may be examples of corresponding devices described with reference to FIG. 1. In some examples, the process flow 200 may be implemented by a computing device 105, a fingerprint manager 115, a server 120, or any combination thereof.

In the following description of the process flow 200, the operations between the computing device 105-a, the computing device 105-b, and the computing device 105-c may be transmitted in a different order than the exemplary order shown, or the operations performed by the computing device 105-a, the computing device 105-b, and the computing device 105-c may be performed in different orders or at different times. Certain operations may also be left out of the process flow 200, or other operations may be added to the process flow 200. Additionally, devices other than the computing devices 105 may perform some of the operations described in the process flow 200.

At 205, the computing device 105-a may monitor an application executing on computing device 105-a and/or executing on another computing device. The computing device 105-a may track computer behaviors of the application based on the monitoring, such as actions or processes (e.g., computer processes) performed or expected to be performed by the application, features of the application (e.g., a UI), data loaded, saved, or accessed by the application, etc. At 210, the computing device 105-a may build a digital fingerprint for the application. In some examples, the computing device 105-a may generate a partial digital fingerprint (e.g., at least one bit) for a tracked computer behavior of the application, and may combine such partial digital fingerprints to generate a digital fingerprint (e.g., a sequence of bits) describing or indicating the tracked computer behaviors of the application. At 215, the computing device 105-a may transmit the digital fingerprint. For example, the computing device 105-a may transmit the sequence of bits describing the monitored (e.g., tracked) computer behaviors of the application to another computing device 105, a network device such as a server 120, a database such as a database 125, or any combination thereof.

At 220, the computing device 105-b may aggregate a set of digital fingerprints. For example, the computing device 105-b may receive a set of digital fingerprints associated with an application. In some cases, the computing device 105-b may request the set of digital fingerprints from another device (e.g., a server 120 with access to the database 125), may directly receive the set of digital fingerprints from other computing devices 105, or both. In some cases, at least some digital fingerprints from the set of digital fingerprints may be generated from telemetry data (e.g., data gathered from monitoring application usage on one or more computing devices such as computing device 105-a).

The computing device 105-b may generate an aggregate digital fingerprint of the application. For instance, the computing device 105-b may perform an algorithm or other computing process to determine a set of normal computer behaviors from the set of digital fingerprints (e.g., determining that one or more computer behaviors in a portion of the set of digital fingerprints are outliers, and remove them from the set of normal or common computer behaviors of the application). In some examples, the computing device 105-b may update a database with an indication of the application and the associated aggregate digital fingerprint (e.g., a sequence of bits indicating the set of normal computer behaviors). In some cases, an aggregate digital fingerprint may include one or more abnormal computer behaviors.

At 225, the computing device 105-c may monitor a computer behavior or process of the application. For example, the computing device 105-*c* may track a computer behavior of the application, such as accessing a network. At 235, the computing device 105-*c* may determine that the computer behavior or process of the application is abnormal based on the set of digital fingerprints. For example, the computing device 105-*c* may receive or generate the aggregate digital fingerprint (e.g., a sequence of bits indicating a set of normal computer behaviors for the application, or a sequence of bits indicating a set of abnormal computer behaviors for the application, or both). In some examples, the computing device 105-*c* may receive the aggregate digital fingerprint from a database 125 or another device such as the computing device 105-*b* or the server 120. In some other examples, the computing device 105-*c* may generate the aggregate digital fingerprint from the set of digital fingerprints.

The computing device 105-*c* may compare the monitored or tracked computer behavior to the aggregate digital fingerprint. For example, the computing device 105-*c* may determine that the tracked computer behavior of accessing the network is not included or indicated in the aggregate digital fingerprint. The computing device 105-*c* may determine that the tracked computer behavior is an abnormal computer behavior of the application. At 240, the computing device 105-*c* may perform a security action. For example, the computing device 105-*c* may enforce the abnormal computer behavior by quarantining the computer behavior or the application, generating, transmitting, or displaying a report of the abnormal computer behavior and any associated information (e.g., displaying a report to a user of the computing device 105-*c* including a selectable option to perform one or more additional security actions), and the like.

The operations performed by the computing devices 105 as part of, but not limited to, process flow 200 may provide improvements to security threat detection, among other advantages. Furthermore, the operations performed by the computing devices 105 as part of, but not limited to, process flow 200 may provide benefits and enhancements to the operation of the computing devices 105. For example, the computing devices 105 may promote efficient creation, aggregation, and enforcement of application behavioral fingerprints. Therefore, computing devices 105 may also support increased detection of abnormal computer behaviors and, in some examples, may promote enforcement of the abnormal computer behaviors, for example, performance of a security action to protect the computing devices 105 from the abnormal computer behavior, among other benefits. Thereby, further providing improvements to the operation of computing devices 105, for example, such as improved processor operation, reduced power consumption, improved memory utilization, among other benefits by enabling application behavioral fingerprints.

Figure 3:
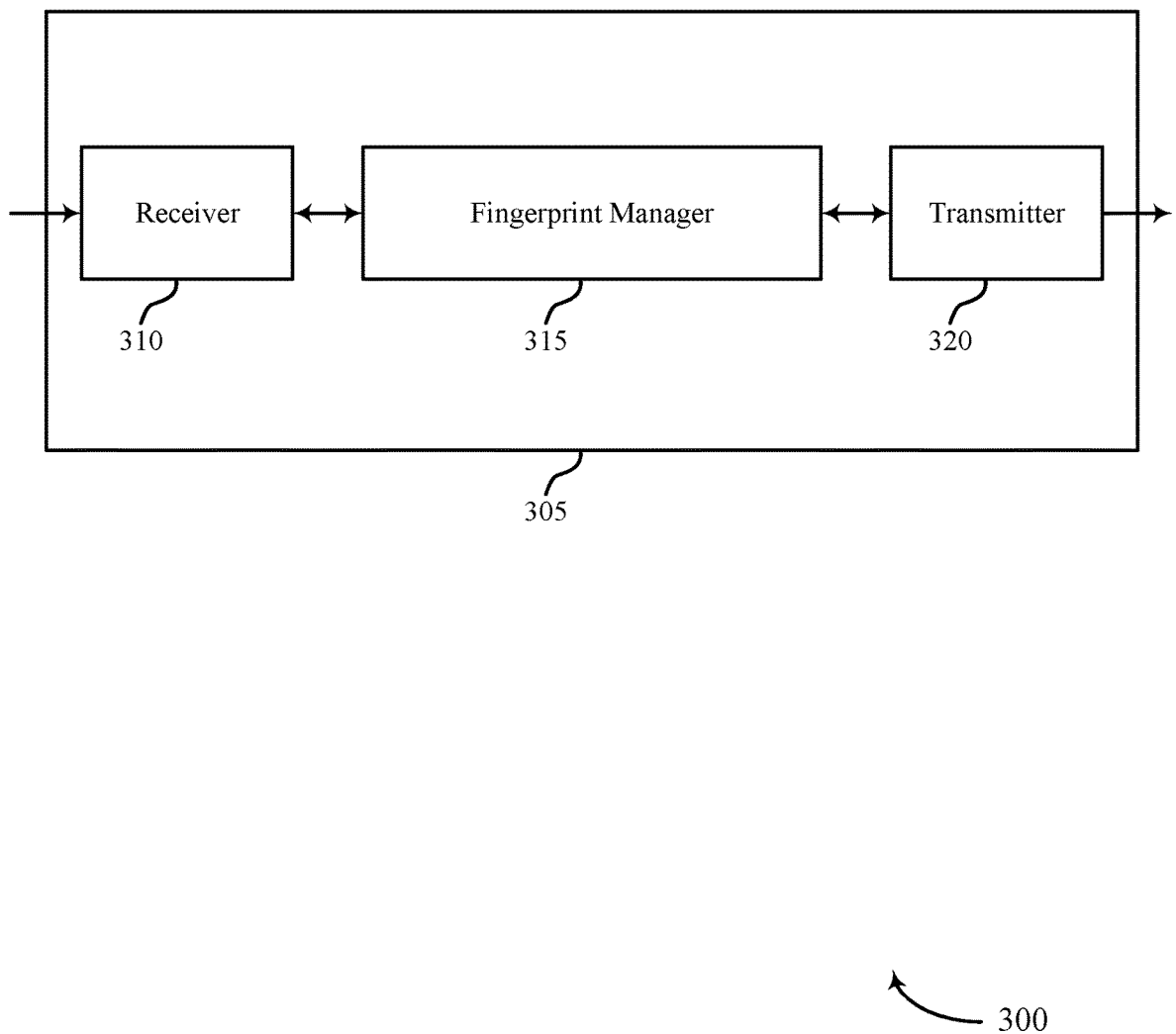
FIGS. 3 and 4 show block diagrams of computing devices that support application behavioral fingerprints in accordance with aspects of the present disclosure.

FIG. 3 shows a block diagram 300 of a computing device 305 that supports application behavioral fingerprints in accordance with aspects of the present disclosure. The computing device 305 may be an example of aspects of a computing device as described herein. The computing device 305 may include a receiver 310, a fingerprint manager 315, and a transmitter 320. The computing device 305 may also include one or more processors. Each of these components may be in communication with one another (e.g., via one or more buses).

The receiver 310 may receive information such as packets, user data, or control information associated with various information channels (e.g., control channels, data channels, and information related to application behavioral fingerprints, etc.). Information may be passed on to other components of the computing device 305. The receiver 310 may be an example of aspects of the transceiver 620 described with reference to FIG. 6. The receiver 310 may utilize a single antenna or a set of antennas.

The fingerprint manager 315 may monitor a computer process related to an application running on a computing device of the one or more computing devices, analyze a database including a set of digital fingerprints, where a digital fingerprint of the set of digital fingerprints relates to the application, the digital fingerprint including an indication of a set of computer processes related to the application that are classified as normal computer processes for the application, determine that the computer process related to the application is an abnormal computer process based on the digital fingerprint of the application, and perform a security action to protect the computing device against the abnormal computer process based on the determining. The fingerprint manager 315 may be an example of aspects of the fingerprint manager 610 described herein.

The fingerprint manager 315, or its sub-components, may be implemented in hardware, code (e.g., software or firmware) executed by a processor, or any combination thereof. If implemented in code executed by a processor, the functions of the fingerprint manager 315, or its sub-components may be executed by a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described in the present disclosure.

The fingerprint manager 315, or its sub-components, may be physically located at various positions, including being distributed such that portions of functions are implemented at different physical locations by one or more physical components. In some examples, the fingerprint manager 315, or its sub-components, may be a separate and distinct component in accordance with various aspects of the present disclosure. In some examples, the fingerprint manager 315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 320 may transmit signals generated by other components of the computing device 305. In some examples, the transmitter 320 may be collocated with a receiver 310 in a transceiver module. For example, the transmitter 320 may be an example of aspects of the transceiver 620 described with reference to FIG. 6. The transmitter 320 may utilize a single antenna or a set of antennas.

Figure 4:
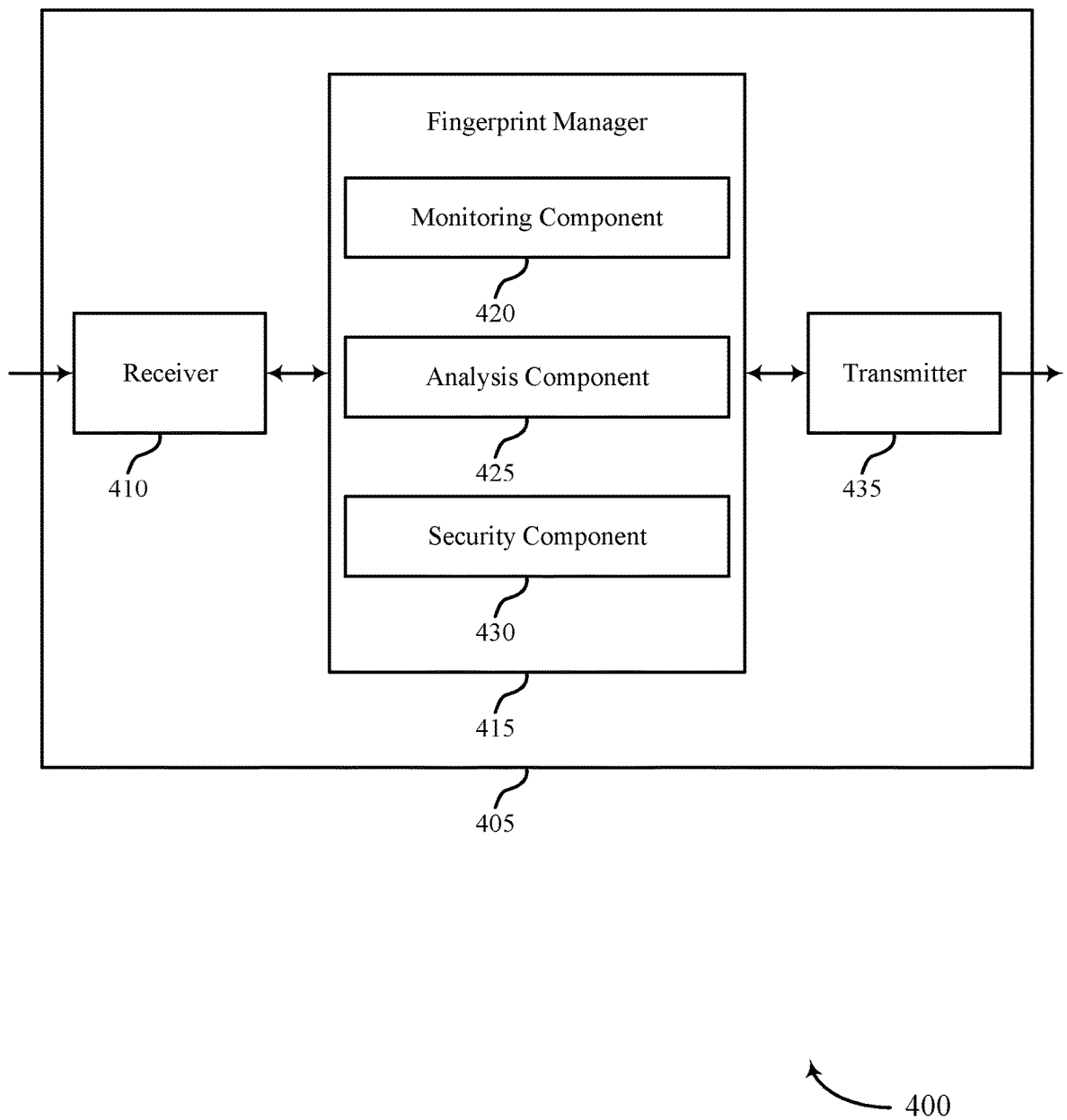

FIG. 4 shows a block diagram 400 of a computing device 405 that supports application behavioral fingerprints in accordance with aspects of the present disclosure. The computing device 405 may be an example of aspects of a computing device 305 or a computing device 105 as described herein. The computing device 405 may include a receiver 410, a fingerprint manager 415, and a transmitter 435. The computing device 405 may also include one or more processors. Each of these components may be in communication with one another (e.g., via one or more buses).

The receiver 410 may receive information such as packets, user data, or control information associated with various information channels (e.g., control channels, data channels, and information related to application behavioral fingerprint, etc.). Information may be passed on to other components of the computing device 405. The receiver 410 may be an example of aspects of the transceiver 620 described with reference to FIG. 6. The receiver 410 may utilize a single antenna or a set of antennas.

The fingerprint manager 415 may be an example of aspects of the fingerprint manager 315 as described herein. The fingerprint manager 415 may include a monitoring component 420, an analysis component 425, and a security component 430. The fingerprint manager 415 may be an example of aspects of the fingerprint manager 610 described herein. The monitoring component 420 may monitor a computer process related to an application running on a computing device of the one or more computing devices. The analysis component 425 may analyze a database including a set of digital fingerprints, where a digital fingerprint of the set of digital fingerprints relates to the application, the digital fingerprint including an indication of a set of computer processes related to the application that are classified as normal computer processes for the application and determine that the computer process related to the application is an abnormal computer process based on the digital fingerprint of the application. The security component 430 may perform a security action to protect the computing device against the abnormal computer process based on the determining.

The transmitter 435 may transmit signals generated by other components of the computing device 405. In some examples, the transmitter 435 may be collocated with a receiver 410 in a transceiver module. For example, the transmitter 435 may be an example of aspects of the transceiver 620 described with reference to FIG. 6. The transmitter 435 may utilize a single antenna or a set of antennas.

Figure 5:
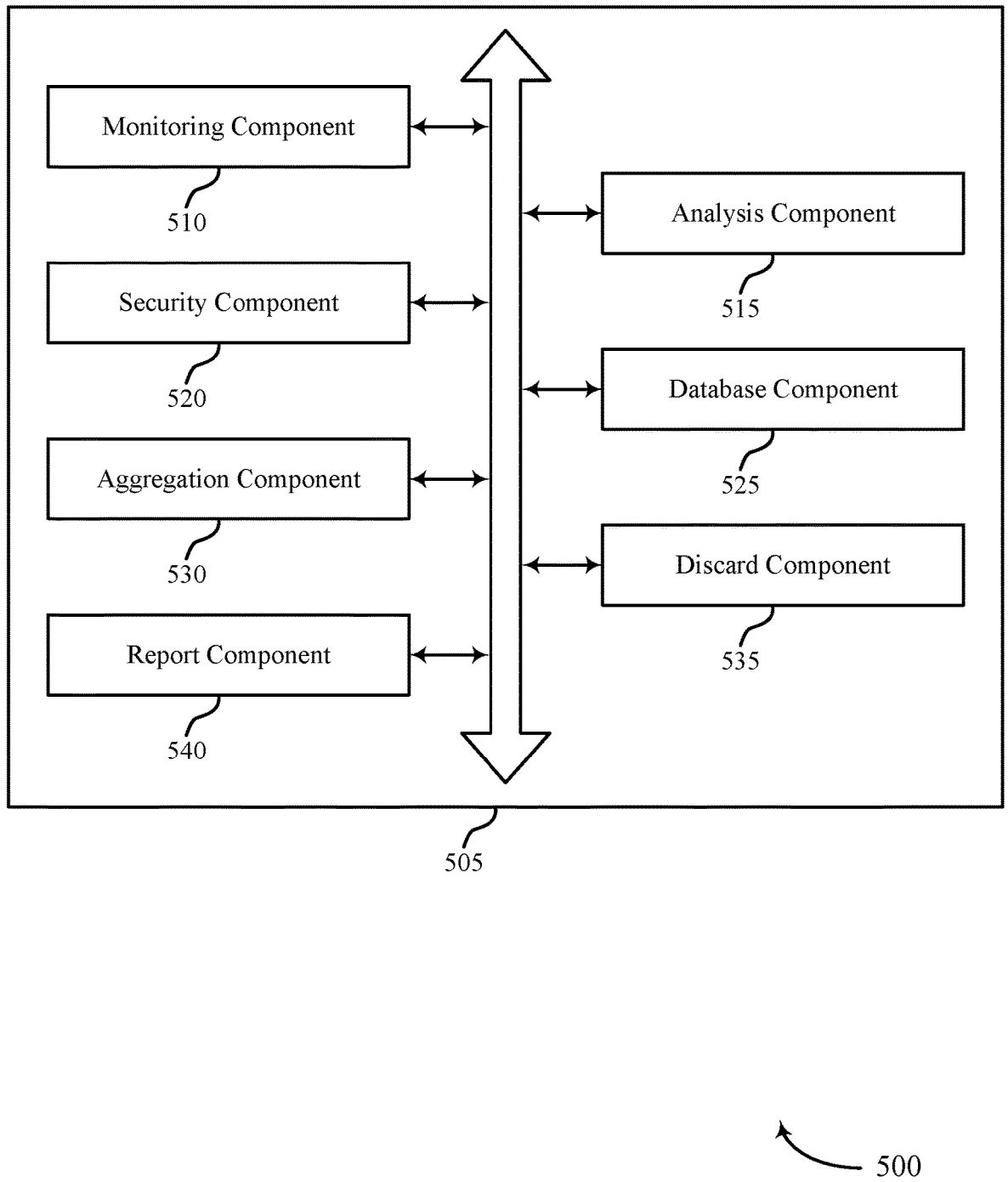
FIG. 5 shows a block diagram of a fingerprint manager that supports application behavioral fingerprints in accordance with aspects of the present disclosure.

FIG. 5 shows a block diagram 500 of a fingerprint manager 505 that supports application behavioral fingerprints in accordance with aspects of the present disclosure. The fingerprint manager 505 may be an example of aspects of a fingerprint manager 315, a fingerprint manager 415, or a fingerprint manager 610 described herein. The fingerprint manager 505 may include a monitoring component 510, an analysis component 515, a security component 520, a database component 525, an aggregation component 530, a discard component 535, and a report component 540. Each of these modules may communicate, directly or indirectly, with one another (e.g., via one or more buses).

The monitoring component 510 may monitor a computer process related to an application running on a computing device of the one or more computing devices. The analysis component 515 may analyze a database including a set of digital fingerprints, where a digital fingerprint of the set of digital fingerprints relates to the application, the digital fingerprint including an indication of a set of computer processes related to the application that are classified as normal computer processes for the application. In some examples, the analysis component 515 may determine that the computer process related to the application is an abnormal computer process based on the digital fingerprint of the application. In some examples, the indication includes a bit sequence, one or more bits of the bit sequence corresponding to a computer process of the set of computer processes. In some examples, the digital fingerprint includes an additional indication of a set of additional computer processes associated with the set of computer processes, and the set of additional computer processes classify as additional normal computer processes associated with the set of computer processes.

In some examples, analysis component 515 may perform an analysis on the bit sequence corresponding to the set of computer process behaviors generated by the computing device and the one or more additional bit sequences corresponding to the set of computer process behaviors generated by the one or more additional computing devices of the one or more computing devices. In some examples, the analysis component 515 may determine that the set of computer processes classify as the normal computer processes for the application based on a correlation between the bit sequence corresponding to the set of computer process behaviors generated by the computing device and the one or more additional bit sequences corresponding to the set of computer process behaviors generated by the one or more additional computing devices of the one or more computing devices. In some examples, the analysis component 515 may generate the digital fingerprint related to the application based on the correlation.

The security component 520 may perform a security action on the computing device of the one or more computing devices to protect the computing device against the abnormal computer process based on the determining. In some examples, security component 520 may perform at least one of quarantining the application on the computing device, preventing access to a network enterprise for the computing device, preventing access to one or more features of the computing device, performing a malware scan on the computing device, or any combination thereof. In some examples, the security component 520 may transmit, to a computing device that is associated with an information security user, a report including information of the abnormal computer process related to the application running on the computing device and a selectable option to perform a supplementary security action including at least one of preventing access to a network enterprise for the computing device, preventing access to one or more features of the computing device, or performing a malware scan on the computing device, or any combination thereof. In some cases, the one or more computing devices may include the computing device associated with the information security user.

The database component 525 may automatically generate the database including the set of digital fingerprints. In some examples, the database component 525 may monitor a set of computer process behaviors associated with the set of computer processes. In some examples, the database component 525 may generate a bit sequence corresponding to the set of computer processes based on the set of computer process behaviors, one or more bits of the bit sequence corresponding to a computer process of the set of computer processes. In some examples, the database component 525 may receive, from one or more additional computing devices of the one or more computing devices, one or more additional bit sequences corresponding to the set of computer processes based on an additional set of computer process behaviors.

In some examples, the database component 525 may monitor by the one or more additional computing devices of the one or more computing devices, the additional set of computer process behaviors associated with the set of computer processes. In some examples, the database component 525 may generate the one or more additional bit sequences corresponding to the set of computer processes based on the additional set of computer process behaviors. In some cases, the bit sequence generated by the computing device of the one or more computing devices includes a partial digital fingerprint related to the application. In some cases, the one or more additional bit sequences generated by the one or more additional computing devices of the one or more computing devices includes one or more additional partial digital fingerprints related to the application.

The aggregation component 530 may aggregate matching computer process behaviors associated with the set of computer processes based on the correlation. The discard component 535 may discard nonmatching computer process behaviors associated with the set of computer processes based on the correlation. The report component 540 may transmit, to the computing device of the one or more computing devices, a report including information of the abnormal computer process related to the application running on the computing device. In some examples, the report component 540 may include, in the report, a selectable option to perform a supplementary security action including at least one of preventing access to a network enterprise for the computing device, preventing access to one or more features of the computing device, or performing a malware scan on the computing device, or any combination thereof.

Figure 6:
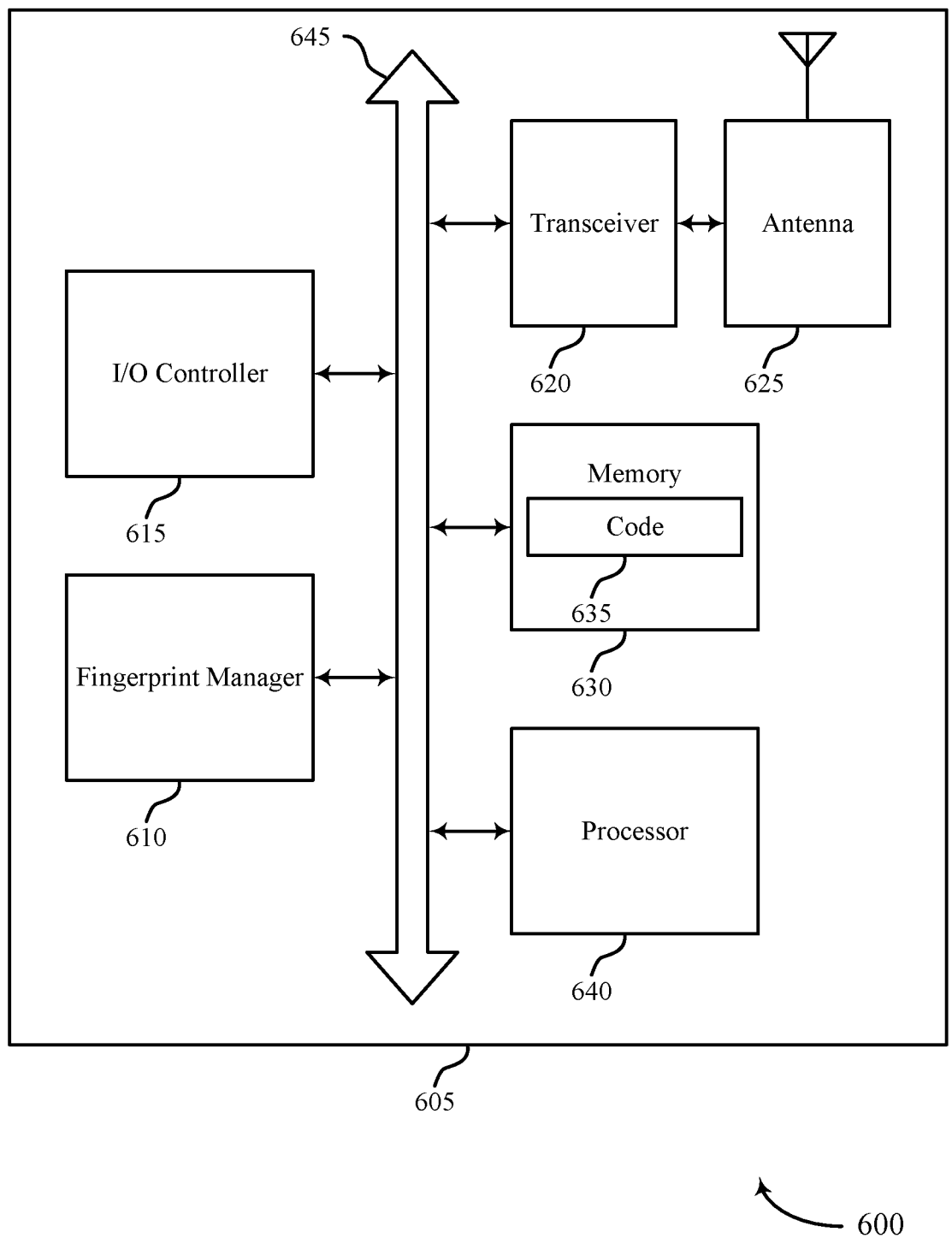
FIG. 6 shows a diagram of a system including a computing device that supports application behavioral fingerprints in accordance with aspects of the present disclosure.

FIG. 6 shows a diagram of a system 600 including a computing device 605 that supports application behavioral fingerprints in accordance with aspects of the present disclosure. The computing device 605 may be an example of or include the components of computing device 305, computing device 405, or a computing device as described herein. The computing device 605 may include components for bi-directional voice and data communications including components for transmitting and receiving communications, including a fingerprint manager 610, an I/O controller 615, a transceiver 620, an antenna 625, memory 630, and a processor 640. These components may be in electronic communication via one or more buses (e.g., bus 645).

The fingerprint manager 610 may monitor a computer process related to an application running on a computing device of the one or more computing devices, analyze a database including a set of digital fingerprints, where a digital fingerprint of the set of digital fingerprints relates to the application, the digital fingerprint including an indication of a set of computer processes related to the application that are classified as normal computer processes for the application, determine that the process related to the application is an abnormal computer process based on the digital fingerprint of the application, and perform a security action to protect the computing device against the abnormal computer process based on the determining.

The I/O controller 615 may manage input and output signals for the computing device 605. The I/O controller 615 may also manage peripherals not integrated into the computing device 605. In some cases, the I/O controller 615 may represent a physical connection or port to an external peripheral. In some cases, the I/O controller 615 may utilize an operating system such as iOS, ANDROID, MS-DOS, MS-WINDOWS, OS/2, UNIX, LINUX, or another known operating system. In other cases, the I/O controller 615 may represent or interact with a modem, a keyboard, a mouse, a touchscreen, or a similar computing device. In some cases, the I/O controller 615 may be implemented as part of a processor. In some cases, a user may interact with the computing device 605 via the I/O controller 615 or via hardware components controlled by the I/O controller 615.

The transceiver 620 may communicate bi-directionally, via one or more antennas, wired, or wireless links as described above. For example, the transceiver 620 may represent a wireless transceiver and may communicate bi-directionally with another wireless transceiver. The transceiver 620 may also include a modem to modulate the packets and provide the modulated packets to the antennas for transmission, and to demodulate packets received from the antennas. In some cases, the computing device 605 may include a single antenna 625. However, in some cases the computing device 605 may have more than one antenna 625, which may be capable of concurrently transmitting or receiving multiple wireless transmissions.

The memory 630 may include random access memory (RAM) and read only memory (ROM). The memory 630 may store computer-readable, computer-executable code 635 including instructions that, when executed, cause the processor to perform various functions described herein. In some cases, the memory 630 may contain, among other things, a basic input/output system (BIOS) which may control basic hardware or software operation such as the interaction with peripheral components or computing devices. The code 635 may include instructions to implement aspects of the present disclosure, including instructions to support protecting against abnormal behavior. The code 635 may be stored in a non-transitory computer-readable medium such as system memory or other type of memory. In some cases, the code 635 may not be directly executable by the processor 640 but may cause a computer (e.g., when compiled and executed) to perform functions described herein.

The processor 640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 640 may be configured to operate a memory array using a memory controller. In other cases, a memory controller may be integrated into the processor 640. The processor 640 may be configured to execute computer-readable instructions stored in a memory (e.g., the memory 630) to cause the computing device 605 to perform various functions (e.g., functions or tasks supporting application behavioral fingerprint).

Figure 7:
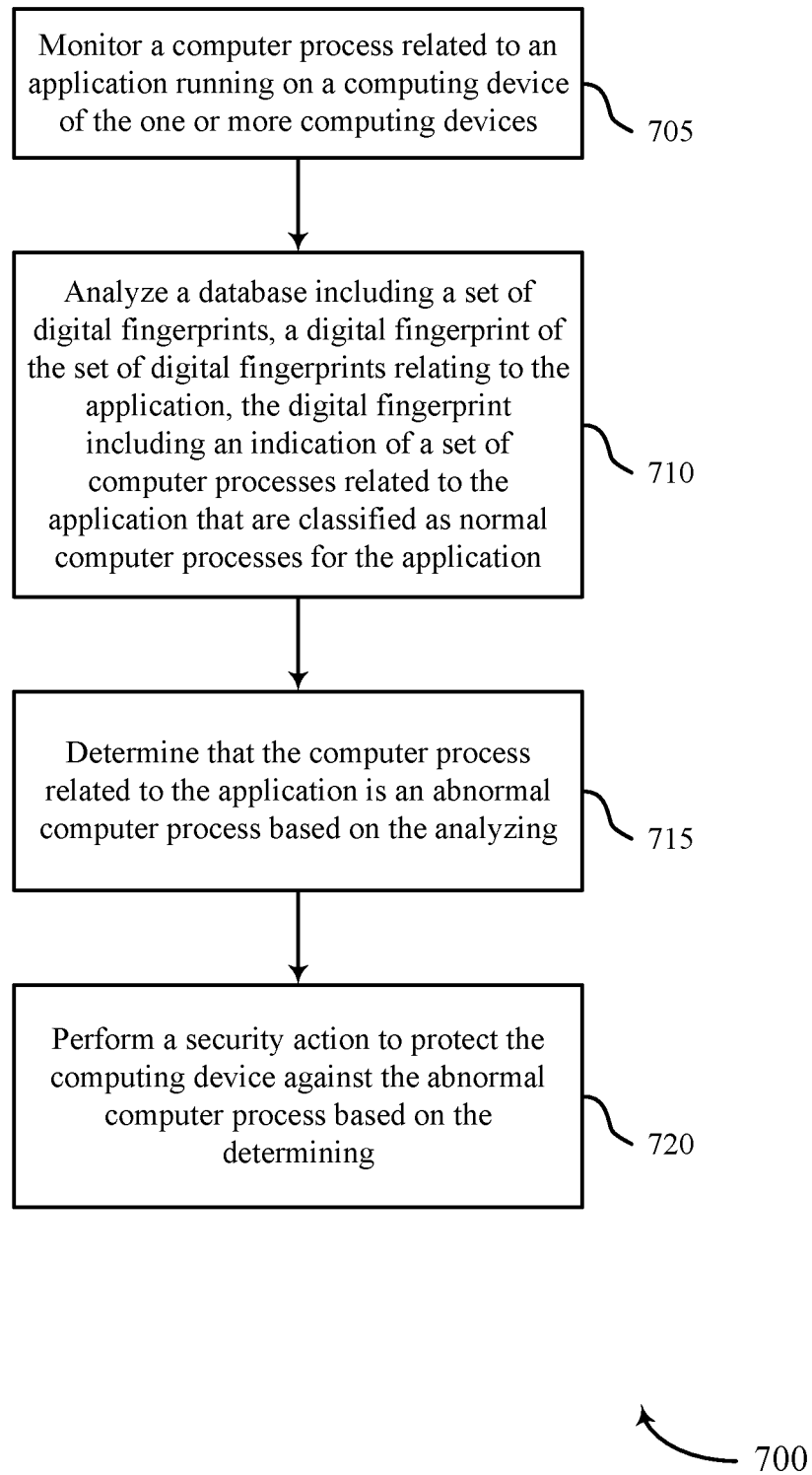
FIGS. 7 and 8 show flowcharts illustrating methods that support application behavioral fingerprints in accordance with aspects of the present disclosure.

FIG. 7 shows a flowchart illustrating a method 700 that supports application behavioral fingerprints in accordance with aspects of the present disclosure. The operations of method 700 may be implemented by a computing device or its components as described herein. For example, the operations of method 700 may be performed by a fingerprint manager as described with reference to FIGS. 3 through 6. In some examples, a computing device may execute a set of instructions to control the functional elements of the computing device to perform the functions described below. Additionally or alternatively, a computing device may perform aspects of the functions described below using special-purpose hardware.

At 705, the computing device may monitor a computer process related to an application running on a computing device of the one or more computing devices. The operations of 705 may be performed according to the methods described herein. In some examples, aspects of the operations of 705 may be performed by a monitoring component as described with reference to FIGS. 3 through 6.

At 710, the computing device may analyze a database including a set of digital fingerprints, a digital fingerprint of the set of digital fingerprints relating to the application, the digital fingerprint including an indication of a set of computer processes related to the application that are classified as normal computer processes for the application. The operations of 710 may be performed according to the methods described herein. In some examples, aspects of the operations of 710 may be performed by an analysis component as described with reference to FIGS. 3 through 6.

At 715, the computing device may determine that the computer process related to the application is an abnormal computer process based on the analyzing. The operations of 715 may be performed according to the methods described herein. In some examples, aspects of the operations of 715 may be performed by an analysis component as described with reference to FIGS. 3 through 6.

At 720, the computing device may perform a security action to protect the computing device against the abnormal computer process based on the determining. The operations of 720 may be performed according to the methods described herein. In some examples, aspects of the operations of 720 may be performed by a security component as described with reference to FIGS. 3 through 6.

Figure 8:
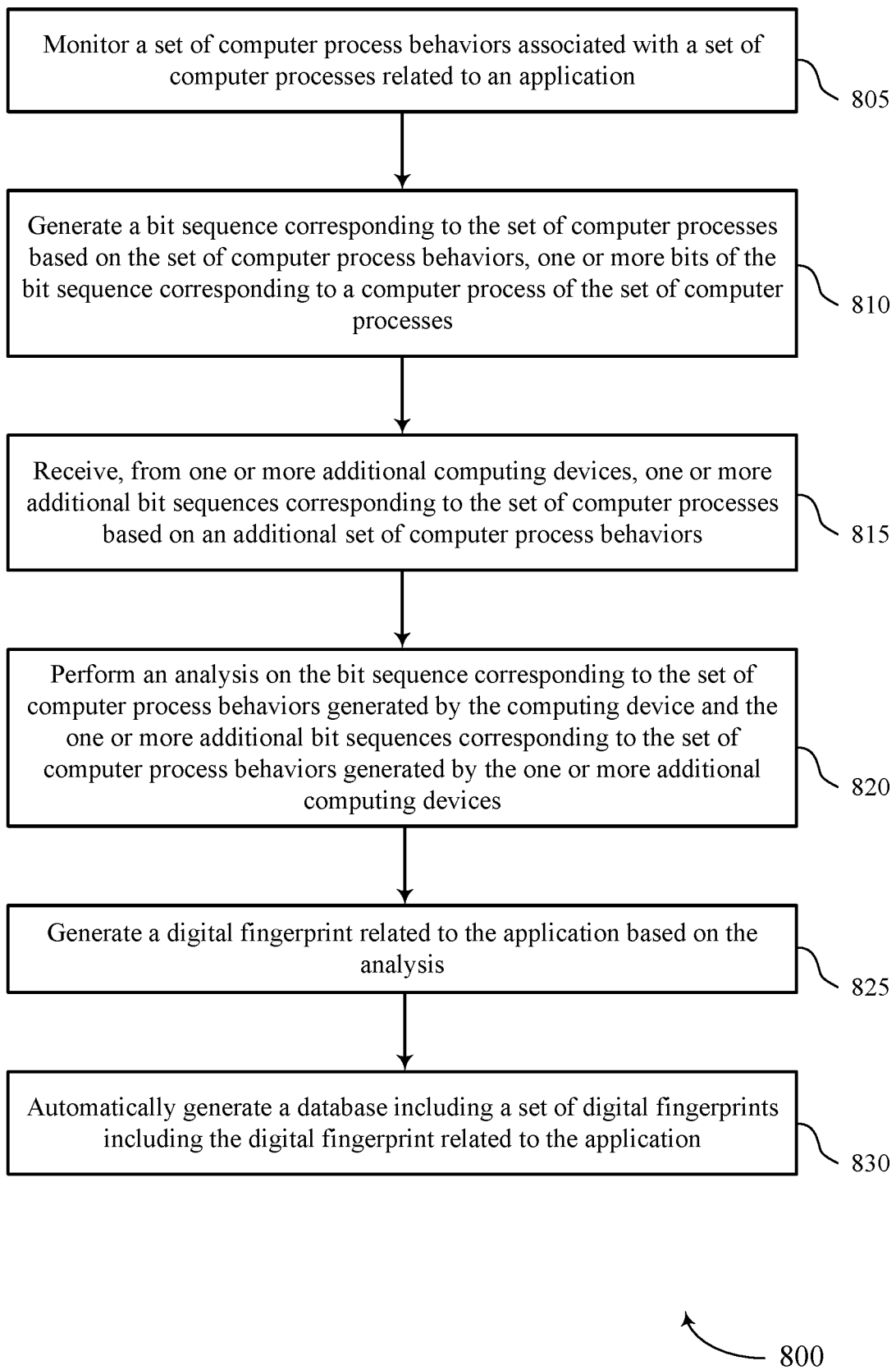

FIG. 8 shows a flowchart illustrating a method 800 that supports application behavioral fingerprints in accordance with aspects of the present disclosure. The operations of method 800 may be implemented by a computing device or its components as described herein. For example, the operations of method 800 may be performed by a fingerprint manager as described with reference to FIGS. 3 through 6. In some examples, a computing device may execute a set of instructions to control the functional elements of the computing device to perform the functions described below. Additionally or alternatively, a computing device may perform aspects of the functions described below using special-purpose hardware.

At 805, the computing device may monitor a set of computer process behaviors associated with a set of computer processes related to an application. The operations of 805 may be performed according to the methods described herein. In some examples, aspects of the operations of 805 may be performed by a database component as described with reference to FIGS. 3 through 6.

At 810, the computing device may generate a bit sequence corresponding to the set of computer processes based on the set of computer process behaviors, one or more bits of the bit sequence corresponding to a computer process of the set of computer processes. The operations of 810 may be performed according to the methods described herein. In some examples, aspects of the operations of 810 may be performed by a database component as described with reference to FIGS. 3 through 6.

At 815, the computing device may receive, from one or more additional computing devices, one or more additional bit sequences corresponding to the set of computer processes based on an additional set of computer process behaviors. The operations of 815 may be performed according to the methods described herein. In some examples, aspects of the operations of 815 may be performed by a database component as described with reference to FIGS. 3 through 6.

At 820, the computing device may perform an analysis on the bit sequence corresponding to the set of computer process behaviors generated by the computing device and the one or more additional bit sequences corresponding to the set of computer process behaviors generated by the one or more additional computing devices. The operations of 820 may be performed according to the methods described herein. In some examples, aspects of the operations of 820 may be performed by a database component as described with reference to FIGS. 3 through 6.

At 825, the computing device may generate a digital fingerprint related to the application based on the analysis. The operations of 825 may be performed according to the methods described herein. In some examples, aspects of the operations of 825 may be performed by a database component as described with reference to FIGS. 3 through 6

At 830, the device may automatically generate a database including a set of digital fingerprints including the digital fingerprint related to the application. The operations of 830 may be performed according to the methods described herein. In some examples, aspects of the operations of 830 may be performed by a database component as described with reference to FIGS. 3 through 6.

It should be noted that the methods described herein describe possible implementations, and that the operations and the steps may be rearranged or otherwise modified and that other implementations are possible. Further, aspects from two or more of the methods may be combined.

Figure 9:
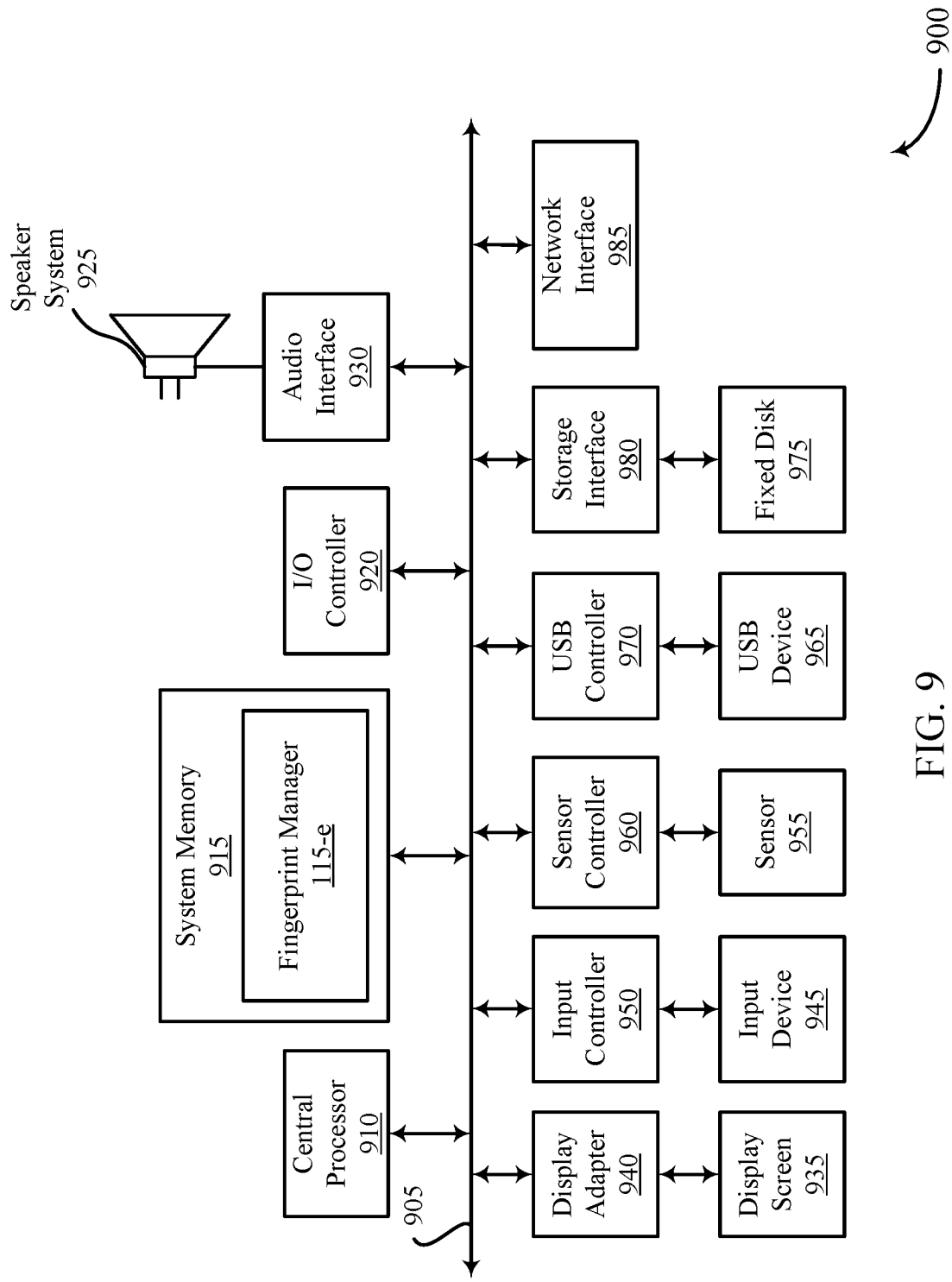
FIG. 9 shows a block diagram of a computing system that supports application behavioral fingerprints in accordance with aspects of the present disclosure.

FIG. 9 shows a block diagram of a computing system 900 that supports application behavioral fingerprints in accordance with aspects of the present disclosure. For example, all or a portion of the computing system 900 may perform and be a means for performing, either alone or in combination with other elements, one or more of the operations described herein (such as one or more of the operations as described in FIGS. 1 through 8). All or a portion of the computing system 900 may also perform or be a means for performing any other operations, methods, or processes described and illustrated herein.

The computing system 900 may be any single or multi-processor computing device or system capable of executing computer-readable instructions. The computing system 900 may be an example of the computing device 105 or the server 120 as described with reference to FIG. 1. For example, the computing system 900 may include, but is not limited to, workstations, laptops, client-side terminals, servers, distributed computing systems, handheld devices, or any other computing system or device. In some cases, the computing system 900 may include at least one central processor 910 and a system memory 915. The central processor 910 may include any type or form of physical processing unit (e.g., a hardware-implemented central processing unit) capable of processing data or interpreting and executing instructions. In some cases, the central processor 910 may receive instructions from a computer software application. These instructions may cause the central processor 910 to perform the functions of one or more of the exemplary cases described and illustrated herein. The system memory 915 may include any type or form of volatile or non-volatile storage device or medium capable of storing data and other computer-readable instructions. Examples of the system memory 915 include RAM, ROM, flash memory, or any other suitable memory device. In one example, a fingerprint manager 115-*e* may be loaded into the system memory 915.

In some cases, the computing system 900 may include a bus 905 which interconnects major subsystems of the computing system 900, such as the central processor 910, the system memory 915, an input/output controller 920, an external audio device, such as a speaker system 925 via an audio output interface 930, an external device, such as a display screen 935 via display adapter 940, an input device 945 (e.g., remote control device interfaced with an input controller 950), multiple universal serial bus (USB) devices 965 (interfaced with a USB controller 970), and a storage interface 980. Also included are at least one sensor 955 connected to the bus 905 through a sensor controller 960 and a network interface 985 (coupled directly to bus 905).

The bus 905 allows data communication between the central processor 910 and the system memory 915, which may include ROM or flash memory, and RAM, as previously noted. The RAM is generally the main memory into which the operating system and application programs are loaded. The ROM or flash memory can contain, among other code, BIOS or UEFI, which controls basic hardware operation such as the interaction with peripheral components or devices. Applications (e.g., the applications 110) resident with the computing system 900 may be generally stored on and accessed via a non-transitory computer readable medium, such as a hard disk drive (e.g., a fixed disk 975) or other storage medium. Additionally, applications can be in the form of electronic signals modulated in accordance with the application and data communication technology when accessed via the interface 985.

The storage interface 980, as with the other storage interfaces of the computing system 900, can connect to a standard computer readable medium for storage and/or retrieval of information, such as the fixed disk drive 975. The fixed disk drive 975 may be a part of the computing system 900 or may be separate and accessed through other interface systems. The network interface 985 may provide a direct connection to a remote server via a direct network link to the Internet via a POP (point of presence). The network interface 985 may provide such connection using wireless techniques, including digital cellular telephone connection, Cellular Digital Packet Data (CDPD) connection, digital satellite data connection, or the like.

Many other devices or subsystems may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 9 need not be present to practice the present techniques. The devices and subsystems can be interconnected in different ways from that shown in FIG. 9. The aspect of some operations of a system such as that shown in FIG. 9 are readily known in the art and are not discussed in detail in this application. Code to implement the present disclosure can be stored in a non-transitory computer-readable medium such as one or more of the system memory 915 or the fixed disk 975. The operating system provided on the computing system 900 may be iOS, ANDROID, MS-DOS, MS-WINDOWS, OS/2, UNIX®, LINUX, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other cases of the present techniques may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The signals associated with the computing system 900 may include wireless communication signals such as radio frequency, electromagnetics, local area network (LAN), wide area network (WAN), metropolitan area network (MAN), virtual private network (VPN), wireless network (using 802.11, for example), cellular network (using 3G, Long Term Evolution (LTE), Next Generation 5G new radio (NR) for example), and/or other signals. The network interface 985 may enable one or more of wireless WAN (WWAN) (e.g., GSM, CDMA, and WCDMA), wireless LAN (WLAN) (e.g., including BLUETOOTH® and Wi-Fi), WMAN (WiMAX) for mobile communications, antennas for Wireless Personal Area Network (WPAN) applications (including radio-frequency identification (RFID) and UWB), etc.

The I/O controller 920 may operate in conjunction with the network interface 1085 or the storage interface 980, or both. The network interface 985 may enable the computing system 900 with the ability to communicate with client devices (e.g., device 105 of FIG. 1), or other devices over the network 130 of FIG. 1, or both. The network interface 985 may provide wired or wireless network connections, or both. In some cases, the network interface 985 may include an Ethernet adapter or Fiber Channel adapter. The storage interface 980 may enable the computing system 900 to access one or more data storage devices. The one or more data storage devices may include two or more data tiers each. The storage interface 980 may include one or more of an Ethernet adapter, a Fiber Channel adapter, Fiber Channel Protocol (FCP) adapter, a small computer system interface (SCSI) adapter, and an internet SCSI (iSCSI) protocol adapter.

Figure 10:
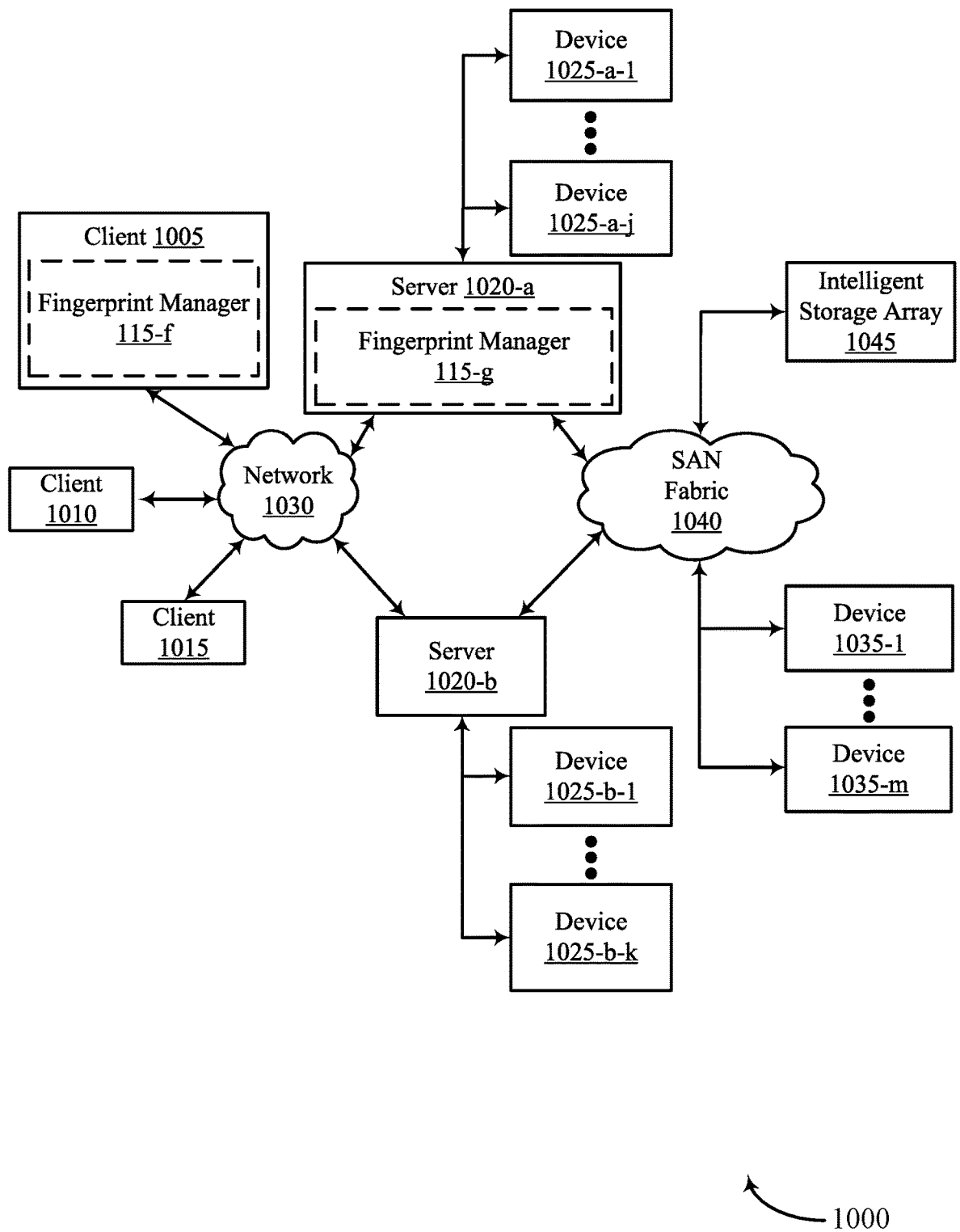
FIG. 10 shows a block diagram of an exemplary network architecture in which client systems and servers may be coupled to a network to support application behavioral fingerprints in accordance with aspects of the present disclosure.

FIG. 10 shows a block diagram of an exemplary network architecture 1000 in which client systems 1005, 1010, 1015 and servers 1020-a, 1020-b may be coupled to a network 1030 to support application behavioral fingerprints in accordance with aspects of the present disclosure. As provided above, all or a portion of the network architecture 1000 may perform or be a means for performing, either alone or in combination with other elements, one or more of the operations disclosed herein (such as one or more of the operations illustrated in FIG. 2, 7, or 8). All or a portion of network architecture 1000 may also be used to perform or be a means for performing other operations and features set forth in the present disclosure.

The client systems 1005, 1010, 1015 may represent any type or form of computing device or system, such as exemplary in the computing system 900 in FIG. 9. Similarly, the servers 1020-a, 1020-b may represent computing devices or systems, such as application servers or database servers, configured to provide various database services and run software applications. The network 1030 may represent any telecommunication or computer network including, for example, an intranet, a WAN, a LAN, a Personal Area Network (PAN), a cellular network (e.g., LTE, LTE-Advanced (LTE-A), Next Generation 5G NR network, or the Internet. In some cases, the client systems 1005, 1010, 1015 and the server 1020-a, 1020-b may include all or a portion of the environment 100 from FIG. 1.

The fingerprint manager 115-f may be located within one of the client system 1005, 1010, or 1015, or any combination thereof to implement the present techniques. The fingerprint manager 115-g may be one example of the fingerprint managers 115 depicted and described in FIGS. 1, 3-6, and 9. The fingerprint manager 115-f may monitor a computer process related to an application running on a client system (e.g., the client system 1005) and analyze a database including a set of digital fingerprints, where a digital fingerprint of the set of digital fingerprints relates to the application. The digital fingerprint may include an indication of a set of computer processes related to the application running on the client system (e.g., the client system 1005) that are classified as normal computer processes for the application. In some cases, the fingerprint manager 115-*f* may determine that the computer process related to the application running on the client system (e.g., the client system 1005) is an abnormal computer process based at least in part on the digital fingerprint of the application, and perform a security action on the client system (e.g., the client system 1005) to protect the client system against the abnormal computer process based at least in part on the determining. Alternatively, the fingerprint manager 115-*f* may optionally be located within one of the server 1020-*a* or the server 1020-*b* to implement the present techniques. The fingerprint manager 115-*g* may be one example of the fingerprint manager 115 depicted and described in FIG. 1, 3-6, or 9.

The server 1020-*a* may be further depicted as having storage devices 1025-*a*-1 through 1025-*a*-*j* directly attached, and server 1020-*b* is depicted with storage devices 1025-*b*-1 through 1025-*b*-*k* directly attached. SAN fabric 1040 supports access to storage devices 1035-1 through 1035-*m* by servers 1020-*a*, 1020-*b*, and so by the client systems 1005, 1010, and 1015 via the network 1030. Intelligent storage array 1045 is also shown as an example of a specific storage device accessible via SAN fabric 1040. With reference to the computing system 900, the network interface 985 or some other means or method can be used to provide connectivity from each of the client systems 1005, 1010, and 1015 to the network 1030.

With reference to the computing system 600, the transceiver 620 or some other means or method can be used to provide connectivity from each of the client systems 1005, 1010, and 1015 to the network 1030. The client systems 1005, 1010, and 1015 are able to access information on the server 1020-*a* or the server 1020-*b* using, for example, a web browser or other client software. Such a client allows the client systems 1005, 1010, and 1015 to access data hosted by the server 1020-*a* or 1020-*b* or one of the storage devices 1025-*a*-1 through 1025-*a*-*j*, 1025-*b*-1 through 1025-*b*-*k*, 1035-1 through 1035-*m*, or the intelligent storage array 1045. FIG. 10 depicts the use of a network such as the Internet for exchanging data, but the present techniques are not limited to the Internet or any particular network-based environment.

In some cases, all or a portion of one or more of the exemplary cases disclosed herein may be encoded as a computer program and loaded onto and executed by the server 1020-*a* or server 1020-*b*, or the storage devices 1025-*a*-1 through 1025-*a*-*j*, the storage devices 1035-1 through 1035-*m*, the intelligent storage array 1045, or any combination thereof. All or a portion of one or more of the exemplary cases disclosed herein may also be encoded as a computer program, run by the server 1020-*a* or the stored in server 1020-*b*, and distributed to the client systems 1005, 1010, and 1015 over the network 1030. As detailed above, the computing system 900 and/or one or more components of the network architecture 1000 may perform and/or be a means for performing, either alone or in combination with other elements, one or more operations of an exemplary method for preventing malware on computing devices.

While the foregoing disclosure sets forth various cases using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various cases have been described and/or illustrated herein in the context of fully functional computing systems, one or more of these exemplary cases may be distributed as a program product in a variety of forms, regardless of the particular type of computer-readable media used to actually carry out the distribution. The cases disclosed herein may also be implemented using software components that perform certain tasks. These software components may include script, batch, or other executable files that may be stored on a computer-readable storage medium or in a computing system. In some cases, these software components may configure a computing system to perform one or more of the exemplary cases disclosed herein.

The various illustrative blocks and modules described in connection with the disclosure herein may be implemented or performed with a general-purpose processor, a DSP, an ASIC, an FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, read-only memory ROM, electrically erasable programmable read only memory (EEPROM), flash memory, compact disk (CD)

ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The foregoing description, for purpose of explanation, has been described with reference to specific cases. However, the illustrative discussions above are not intended to be exhaustive or to limit the invention to the precise forms disclosed. Many modifications and variations are possible in view of the above teachings. The cases were chosen and described in order to best explain the principles of the present techniques and their practical applications, to thereby enable others skilled in the art to best utilize the present techniques and various cases with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

As used herein, the term "security action" may refer to any number of actions the systems described herein may take after determining a packet injection. For example, types of security actions may include preventing the packet from performing any actions on the computing device, alerting an administrator to the potential maliciousness of the connection, quarantine a file related to the connection, delete the file, block a download of the file, and/or warn a user about the connection. In addition, the systems described herein may perform a security action on objects other than a file. For example, the systems described herein may blacklist malicious URLs and/or internet protocol (IP) addresses. Thus, the security actions in conjunction with the methods and systems described herein may improve the security and operating integrity of one or more computing devices by protecting the hardware, firmware, software, or any combination thereof of the one or more computing devices from malicious attack. It should be appreciated that these are not exhaustive lists of the types of security actions which may be performed by the systems described herein. Other security actions are also included in this disclosure.

What is claimed is:

1. A method for protecting against abnormal computer behavior, the method being performed by one or more computing devices comprising at least one processor, the method comprising:

monitoring a computer process related to an application running on a computing device of the one or more computing devices;

automatically generating a database comprising a set of digital fingerprints including a digital fingerprint related to the application, wherein generating the digital fingerprint related to the application comprises aggregating matching computer process behaviors associated with a set of computer processes and discarding nonmatching computer process behaviors associated with the set of computer processes, wherein the aggregating matching computer process behaviors and discarding nonmatching computer process behaviors are based at least in part on a correlation between a bit sequence corresponding to a set of computer process behaviors and one or more additional bit sequences corresponding to the set of computer process behaviors;

analyzing the database comprising the set of digital fingerprints, the digital fingerprint of the set of digital fingerprints relating to the application, the digital fingerprint comprising an indication of the set of computer processes related to the application that are classified as normal computer processes for the application;

determining that the computer process related to the application is an abnormal computer process based at least in part on the analyzing; and performing a security action to protect the computing device against the abnormal computer process based at least in part on the determining.

2. The method of claim 1, wherein the indication comprises the bit sequence, one or more bits of the bit sequence corresponding to a computer process of the set of computer processes.

3. The method of claim 1, wherein the digital fingerprint comprises an additional indication of a set of additional computer processes associated with the set of computer processes, and the set of additional computer processes classify as additional normal computer processes associated with the set of computer processes.

4. The method of claim 1, wherein automatically generating the database comprising the set of digital fingerprints comprises:

monitoring the set of computer process behaviors associated with the set of computer processes;

generating the bit sequence corresponding to the set of computer processes based at least in part on the set of computer process behaviors, one or more bits of the bit sequence corresponding to a computer process of the set of computer processes; and receiving, from one or more additional computing devices of the one or more computing devices, one or more additional bit sequences corresponding to the set of computing processes based at least in part on an additional set of computer process behaviors.

5. The method of claim 4, wherein the bit sequence comprises a partial digital fingerprint related to the application.

6. The method of claim 4, wherein receiving, from one or more additional computing devices of the one or more computing devices, one or more additional bit sequences corresponding to the set of computer processes comprises:

monitoring, by the one or more additional computing devices of the one or more computing devices, the additional set of computer process behaviors associated with the set of computer processes; and generating, by the one or more additional computing devices of the one or more computing devices, the one or more additional bit sequences corresponding to the set of computer processes based at least in part on the additional set of computer process behaviors.

7. The method of claim 6, wherein the one or more additional bit sequences generated by the one or more additional computing devices of the one or more computing devices comprises one or more additional partial digital fingerprints related to the application.

8. The method of claim 4, further comprising:
performing an analysis on the bit sequence corresponding to the set of computer process behaviors generated by the computing device and the one or more additional bit sequences corresponding to the set of computer process behaviors generated by the one or more additional computing devices of the one or more computing devices, wherein the analysis comprises:
determining that the set of computer processes classify as the normal computer process for the application based at least in part on the correlation between the bit sequence corresponding to the set of computer process behaviors generated by the computing device and the one or more additional bit sequences corresponding to the set of computer process behaviors generated by the one or more additional computing devices of the one or more computing devices; and
generating the digital fingerprint related to the application based at least in part on the correlation.

9. The method of claim 1, wherein performing the security action comprises:
transmitting, to the computing device, a report comprising information of the abnormal computer process related to the application running on the computing device.

10. The method of claim 9, further comprising:
including, in the report, a selectable option to perform a supplementary security action comprising at least one of preventing access to a network enterprise for the computing device, preventing access to one or more features of the computing device, or performing a malware scan on the computing device, or any combination thereof.

11. The method of claim 1, wherein:
preforming the security action comprises at least one of quarantining the application on the computing device, preventing access to a network enterprise for the computing device, preventing access to one or more features of the computing device, performing a malware scan on the computing device, or any combination thereof.

12. The method of claim 1, wherein performing the security action comprises:
transmitting, to the computing device that is associated with an information security user, a report comprising information of the abnormal computer process related to the application running on the computing device and a selectable option to perform a supplementary security action comprising at least one of preventing access to a network enterprise for the computing device, preventing access to one or more features of the computing device, or performing a malware scan on the computing device, or any combination thereof.

13. An apparatus for protecting against abnormal computer behavior one or more computing devices, comprising:
a processor,
memory in electronic communication with the processor; and
instructions stored in the memory and executable by the processor to cause the apparatus to:

monitor a computer process related to an application running on a computing device of the one or more computing devices;
automatically generate a database comprising a set of digital fingerprints including a digital fingerprint related to the application, wherein generating the digital fingerprint related to the application comprises aggregating matching computer process behaviors associated with a set of computer processes and discarding nonmatching computer process behaviors associated with the set of computer processes, wherein the aggregating matching computer process behaviors and discarding nonmatching computer process behaviors are based at least in part on a correlation between a bit sequence corresponding to a set of computer process behaviors and one or more additional bit sequences corresponding to the set of computer process behaviors;
analyze the database comprising the set of digital fingerprints, the digital fingerprint of the set of digital fingerprints relating to the application, the digital fingerprint comprising an indication of the set of computer processes related to the application that are classified as normal computer processes for the application;
determine that the computer process related to the application running on the computing device is an abnormal computer process based at least in part on the analyzing; and
perform a security action on the computing device to protect the computing device against the abnormal computer process based at least in part on the determining.

14. The apparatus of claim 13, wherein the indication comprises the bit sequence, one or more bits of the bit sequence corresponding to a computer process of the set of computer processes.

15. The apparatus of claim 13, wherein the digital fingerprint comprises an additional indication of a set of additional computer processes associated with the set of computer processes, and the set of additional computer processes classify as additional normal computer processes associated with the set of computer processes.

16. The apparatus of claim 13, wherein the instructions are further executable by the processor to cause the apparatus to:
automatically generate the database comprising the set of digital fingerprints including the digital fingerprint related to the application.

17. The apparatus of claim 16, wherein the instructions are further executable by the processor to cause the apparatus to:
monitor the set of computer process behaviors associated with the set of computer processes;
generate the bit sequence corresponding to the set of computer processes based at least in part on the set of computer process behaviors, one or more bits of the bit sequence corresponding to a computer process of the set of computer processes; and
receive, from one or more additional computing devices of the one or more computing devices, one or more additional bit sequences corresponding to the set of computer processes based at least in part on an additional set of computer process behaviors.

18. A non-transitory computer-readable medium storing code for protecting against abnormal computer behavior on one or more computing devices, the code comprising instructions executable by a processor to:

monitor a computer process related to an application running on a computing device of the one or more computing devices;

automatically generate a database comprising a set of digital fingerprints including a digital fingerprint related to the application, wherein generating the digital fingerprint related to the application comprises aggregating matching computer process behaviors associated with a set of computer processes and discarding nonmatching computer process behaviors associated with the set of computer processes, wherein the aggregating matching computer process behaviors and discarding nonmatching computer process behaviors are based at least in part on a correlation between a bit sequence corresponding to a set of computer process behaviors and one or more additional bit sequences corresponding to the set of computer process behaviors;

analyze the database comprising the set of digital fingerprints, the digital fingerprint of the set of digital fingerprints relating to the application, the digital fingerprint comprising an indication of the set of computer processes related to the application that are classified as normal computer processes for the application;

determine that the computer process related to the application is an abnormal computer process based at least in part on the analysis; and perform a security action on the computing device of the one or more computing devices to protect the computing device against the abnormal computer process based at least in part on the determining.

* * * * *